United States Patent
Schildbach et al.

(10) Patent No.: US 10,301,433 B2
(45) Date of Patent: *May 28, 2019

(54) CURABLE ORGANOPOLYSILOXANE COMPOSITIONS

(71) Applicant: Wacker Chemie AG, Munich (DE)

(72) Inventors: Daniel Schildbach, Altoetting (DE); Detlev Ostendorf, Dresden (DE); Marko Prasse, Glaubitz (DE); Uwe Scheim, Coswig (DE)

(73) Assignee: WACKER CHEMIE AG, Munich (DE)

( * ) Notice: Subject to any disclaimer, the term of this patent is extended or adjusted under 35 U.S.C. 154(b) by 73 days.

This patent is subject to a terminal disclaimer.

(21) Appl. No.: 15/328,088

(22) PCT Filed: Jul. 14, 2015

(86) PCT No.: PCT/EP2015/066046
§ 371 (c)(1),
(2) Date: Jan. 23, 2017

(87) PCT Pub. No.: WO2016/012305
PCT Pub. Date: Jan. 28, 2016

(65) Prior Publication Data
US 2017/0210856 A1    Jul. 27, 2017

(30) Foreign Application Priority Data

Jul. 23, 2014 (DE) .......... 10 2014 214 408

(51) Int. Cl.
| | | |
|---|---|---|
| *C08G 77/08* | (2006.01) | |
| *C04B 26/32* | (2006.01) | |
| *C08G 77/16* | (2006.01) | |
| *C08K 5/00* | (2006.01) | |
| *C08K 5/29* | (2006.01) | |
| *C08G 77/18* | (2006.01) | |
| *C08K 5/098* | (2006.01) | |
| *C08K 5/31* | (2006.01) | |
| *C08G 77/14* | (2006.01) | |
| *C04B 111/54* | (2006.01) | |

(52) U.S. Cl.
CPC .............. *C08G 77/08* (2013.01); *C04B 26/32* (2013.01); *C08G 77/16* (2013.01); *C08G 77/18* (2013.01); *C08K 5/0091* (2013.01); *C08K 5/29* (2013.01); *C04B 2111/54* (2013.01); *C08G 77/14* (2013.01); *C08K 5/098* (2013.01); *C08K 5/31* (2013.01)

(58) Field of Classification Search
None
See application file for complete search history.

(56) References Cited

U.S. PATENT DOCUMENTS

| | | | | |
|---|---|---|---|---|
| 2,842,522 A * | 7/1958 | Frye | ........................ | C08G 77/18 525/446 |
| 4,248,993 A | 2/1981 | Takago | | |
| 4,395,526 A * | 7/1983 | White | ..................... | C08G 77/18 528/15 |
| 4,517,337 A * | 5/1985 | Lockhart | ................... | C08K 5/57 524/859 |
| 6,048,910 A * | 4/2000 | Furuya | ................... | B01J 35/004 427/515 |
| 7,052,770 B2 * | 5/2006 | Furuya | ................. | C09D 183/04 428/447 |
| 8,372,935 B2 | 2/2013 | Malivemey et al. | | |
| 2008/0207848 A1 * | 8/2008 | Morita | ............... | C08G 59/3254 525/475 |
| 2010/0001311 A1 * | 1/2010 | Taguchi | ................... | C08L 63/00 257/100 |
| 2015/0099849 A1 | 4/2015 | Nakamura et al. | | |

FOREIGN PATENT DOCUMENTS

| EP | 0566936 A1 | 10/1993 |
|---|---|---|
| EP | 2388297 A1 | 11/2011 |
| EP | 2837660 A1 | 2/2015 |
| JP | 2007099955 A2 | 4/2007 |
| WO | 2010146252 A2 | 12/2010 |
| WO | 2013101751 A1 | 7/2013 |
| WO | 2013106193 A1 | 7/2013 |
| WO | 2013153773 A1 | 10/2013 |

OTHER PUBLICATIONS

"Silicones", Encyclopedia of Polymer Science and Technology, Apr. 15, 2003, pp. 765-841, XP007918236, vol. 11, 78 pages.
Andreas Tomanek, "Silicone & Technik", Jul. 1990, pp. 72-73 (ISBN 3-446-16032-9), Munich, 4 pages.

* cited by examiner

*Primary Examiner* — Robert S Loewe
(74) *Attorney, Agent, or Firm* — Brooks Kushman P.C.

(57) ABSTRACT

Artificial stone having excellent mechanical and weatherability properties is prepared from a highly filled crosslinkable organosilicon composition where the filler comprises at least 20 weight percent of coarse fillers, the organosilicon component contains silicon-bonded alkoxy and or hydroxyl groups, with a catalyst containing a metal compound and an amidine or guanidine.

17 Claims, No Drawings

CURABLE ORGANOPOLYSILOXANE COMPOSITIONS

CROSS REFERENCE TO RELATED APPLICATIONS

This application is the U.S. National Phase of PCT Appln. No. PCT/EP2015/066046 filed Jul. 14, 2015, which claims priority to German Application No. 10 2014 214 408.6 filed Jul. 23, 2014, the disclosures of which are incorporated in their entirety by reference herein.

BACKGROUND OF THE INVENTION

1. Field of the Invention

The invention relates to organopolysiloxane compositions curable by condensation reaction, to methods for producing them and to their use, more particularly for producing artificial stones.

2. Description of the Related Art

Organopolysiloxane resins which comprise condensable reactive silyl units, hydroxyl groups for example, and hydrolyzable radicals such as alkoxy groups, are crosslinked by polycondensation typically in the presence of catalysts such as zinc, lead, cobalt or titanium compounds, for instance. Reference in this regard may be made for example to A. Tomanek, Silicone & Technik, [published by Wacker Chemie GmbH, Munich]—Munich, Vienna Hanser, 1990 (ISBN 3-446-16032-9), pages 72 and 73.

Likewise suitable are organosilanes or organopolysiloxanes whose units include a guanidyl unit and which are described in the literature as effective, alternative metal-free curing accelerators. Examples thereof are found in U.S. Pat. Nos. 4,248,993 and 8,372,935.

Moreover, WO-A 2013/101751 and the specifications identified in that publication as prior art describe zinc(II) and zirconium(IV) compounds or salts and also further metals as condensation catalysts for polyorganosiloxane systems.

These curing accelerator or catalyst systems have the disadvantage that, when used in an amount sufficient to achieve sufficiently rapid curing at elevated temperatures, they are active even at room temperature and, in the presence of silanol units and optionally alkoxysilyl units, they directly accelerate the polycondensation reaction and hence the curing of the polyorganosiloxane compositions, meaning that the working time, expressed by the potlife, of the mixtures is very short, and so it is difficult to carry out further processing of the prematurely crosslinked polyorganosiloxane compositions, for example, in a subsequent shaping operation.

SUMMARY OF THE INVENTION

It has now been found that a combination of strong catalysts such as guanidines or amidines and metal-containing catalysts, for example metal chelates such as zinc(II) acetylacetonate or metal salts of organic acids such as zinc(II) 2-ethylhexanoate, exhibits only a low catalytic effect at room temperature, while nevertheless at elevated temperature, a very rapid curing of the mixtures takes place. Subsequent aftercuring of shaped articles at room temperature is, likewise surprisingly, not inhibited or is even accelerated.

DETAILED DESCRIPTION OF THE PREFERRED EMBODIMENTS

A subject of the invention are thus compositions (Z) crosslinkable by condensation reaction and comprising (A) at least one organosilicon component consisting of units of the formula $$R_a(OH)_b(R^1O)_c SiO_{(4-a-b-c)/2} \qquad (I),$$

in which
R may be identical or different and is monovalent, SiC-bonded, optionally substituted hydrocarbon radical having 1 to 18 C atoms, a divalent, optionally substituted, SiC-bonded hydrocarbon radical having 1 to 18 C atoms, or Si-bonded halogen atom,
$R^1$ may be identical or different and is a monovalent, optionally substituted hydrocarbon radical,
a is 0, 1, 2 or 3, preferably 0, 1 or 2,
b is 0, 1, 2 or 3, preferably 0, 1 or 2, more preferably 0 or 1, and
c is 0, 1, 2 or 3,
with the proviso that in formula (I) the sum a+b+c<4, in the organosilicon component (A) the degree of branching, defined as the ratio of the sum of the units of the formula (I) where a is 0 or 1 to the sum of all units of the formula (I), is at least 0.5, and in the organosilicon component (A) in at least 1% of all units of the formula (I) the sum b+c≥1,
(B) at least one metal compound selected from compounds of metals from main groups 3, 4, and 5 and also from transition groups 2, 4, 5, 7, and 8 in the +2 to +5 oxidation states, which comprise at least one carbon atom in a <4 oxidation state, and
(C) at least one nitrogen compound selected from guanidines and amidines.

Examples of hydrocarbon radicals R are alkyl radicals such as the methyl, ethyl, n-propyl, isopropyl, n-butyl, sec-butyl, isobutyl, tert-butyl, n-pentyl, sec-pentyl, isopentyl, neopentyl, and tert-pentyl radicals; hexyl radicals such as the n-hexyl radical; heptyl radicals such as the n-heptyl radical; octyl radicals such as the n-octyl radical and isooctyl radicals such as the 2,4,4-trimethylpentyl radical; nonyl radicals, such as the n-nonyl radical; decyl radicals such as the n-decyl radical; dodecyl radicals such as the n-dodecyl radical; hexadecyl radicals such as the n-hexadecyl radical; octadecyl radicals such as the n-octadecyl radical; cycloalkyl radicals such as the cyclopentyl, cyclohexyl, cycloheptyl, and methylcyclohexyl radicals; alkenyl radicals such as the vinyl, 1-propenyl, 2-propenyl, n-5-hexenyl, 4-vinyl-cyclohexyl, and 3-norbornenyl radicals; aryl radicals such as the phenyl, naphthyl, anthryl, and phenanthryl radicals; alkaryl radicals such as the o-, m-, and p-tolyl, xylyl, mesitylenyl, and o-, m-, and p-ethylphenyl radicals; and aralkyl radicals such as the benzyl radical, and the α- and the β-phenylethyl radicals.

Examples of substituted hydrocarbon radicals R are haloalkyl radicals such as the 3,3,3-trifluoro-n-propyl, the 2,2,2,2',2',2'-hexafluoroisopropyl, and the heptafluoroisopropyl radicals; haloaryl radicals such as the o-, m-, and p-chlorophenyl radicals; gamma-functionalized propyl radicals such as 3-aminopropyl, N-(2-aminoethyl)-3-aminopropyl, N-cyclohexyl-3-aminopropyl, 3-glycidyloxypropyl, 3-mercaptopropyl, and 3-methacryloyloxypropyl radicals; functionalized methyl radicals such as N-cyclohexylaminomethyl, N-phenylaminomethyl, methacryloyloxymethyl, and morpholinomethyl radicals; and also silyl-substituted alkyl radicals such as the 3-trimethoxysilylpropyl, 3-triethoxysilylpropyl, 3-dimethoxymethylsilylpropyl, the 3-diethoxymethylsilylpropyl, 2-trimethoxysilylethyl, 2-triethoxysilylethyl radical, 2-trimethoxysilylethenyl, and 2-triethoxysilylethenyl radicals.

Examples of divalent hydrocarbon radicals R are the methylene, ethylene, and propylene radicals and also the 1,2-ethenediyl radical.

As a result of the production process, a certain fraction of radicals R may also be Si-bonded halogen atoms, more particularly chlorine atoms, but this is not preferred.

Radical R preferably comprises monovalent, SiC-bonded hydrocarbon radicals having 1 to 18 carbon atoms, which are optionally substituted by halogen atoms, hydroxyl groups, amino groups, ether groups, ester groups, epoxy groups, mercapto groups or cyano groups, and also comprises divalent, SiC-bonded hydrocarbon radicals having 1 to 18 carbon atoms, more preferably monovalent and divalent, SiC-bonded hydrocarbon radicals having 1 to 18 carbon atoms, more particularly the methyl, ethyl, n-propyl, isopropyl, n-octyl, 2,4,4-trimethylpentyl, ethylene, 1,2-ethenediyl, vinyl and phenyl radicals.

Most preferably radical R comprises a methyl, ethyl, n-octyl, 2,4,4-trimethylpentyl, vinyl or phenyl radical, and with particular preference, radical R comprises a methyl, 2,4,4-trimethylpentyl or phenyl radical.

Examples of radical $R^1$ are the monovalent hydrocarbon radicals stated for R.

Radical $R^1$ preferably comprises monovalent hydrocarbon radicals having 1 to 18 carbon atoms, more preferably the methyl, ethyl, n-propyl, isopropyl, n-butyl, sec-butyl, tert-butyl or isobutyl radicals, most preferably the methyl or ethyl radicals.

The organosilicon component (A) used inventively may comprise different kinds of units of the formula (I), such as units with b=c=0, units with b=c=1, units with b=0 and c≠0, and units with b≠0 and c=0.

In organosilicon component (A) the degree of branching, defined as the ratio of the sum of the units of the formula (I) where a is 0 or 1 to the sum of all units of the formula (I), is preferably at least 0.7, more preferably 0.8 to 1.0, and most preferably 0.9 to 1.0.

In component (A), in preferably at least 3%, more preferably at least 5%, and most preferably at least 10% of all units of the formula (I) the sum of b+c is ≥1.

The organosilicon component (A) preferably comprises units selected from $RSiO_{3/2}$, $RSi(OR^1)O_{2/2}$, $RSi(OH)O_{2/2}$, $RSi(OR^1)_2O_{1/2}$, $RSi(OH)(OR^1)O_{1/2}$, $R_2SiO_{2/2}$, $R_2(OH)SiO_{1/2}$, $R_2(OR^1)SiO_{1/2}$, $R_3SiO_{1/2}$, $SiO_{4/2}$, $Si(OH)O_{3/2}$, $Si(OR^1)O_{3/2}$, $Si(OR^1)_2O_{2/2}$, $Si(OR^1)(OH)O_{2/2}$, $Si(OR^1)_2(OH)O_{1/2}$, $Si(OR^1)_3O_{1/2}$, and $O_{3/2}SiRSiO_{3/2}$, with component (A) consisting more preferably of units selected from $RSiO_{3/2}$, $RSi(OR^1)O_{2/2}$, $RSi(OH)O_{2/2}$, $RSi(OR^1)_2O_{1/2}$, $RSi(OH)(OR^1)O_{1/2}$, $R_2SiO_{2/2}$, $R_2(OH)SiO_{1/2}$, and $R_2(OR^1)SiO_{1/2}$, where R and $R^1$ are defined as stated above.

In another particularly preferred variant, component (A) consists of units selected from $R_3SiO_{1/2}$, $SiO_{4/2}$, $Si(OH)O_{3/2}$, $Si(OR^1)O_{3/2}$, $Si(OR^1)_2O_{2/2}$, $Si(OR^1)(OH)O_{2/2}$, and $Si(OR^1)_2(OH)O_{1/2}$, where R and $R^1$ are defined as stated above.

The organosilicon component (A) may comprise only one kind of siloxane consisting of units of the formula (I) or else mixtures of different kinds of siloxanes consisting of units of the formula (I), with the proviso that the degree of branching in the organosilicon component (A) is at least 0.5 and in the organosilicon component (A), in at least 1% of all units of the formula (I), the sum b+c is ≥1, preference being given to mixtures. In the individual siloxane molecules the units of the formula (I) are preferably distributed randomly.

The siloxanes present in component (A) are preferably branched siloxanes, more preferably those with a resinous structure.

The organosilicon component (A) preferably consists exclusively of siloxanes having a degree of branching of at least 0.5, more preferably at least 0.7, yet more 0.8 to 1.0, and most preferably 0.9 to 1.0.

Component (A) preferably consists exclusively of siloxanes in which in preferably at least 3%, more preferably at least 5%, and most preferably at least 10% of all units of the formula (I), the sum of b+c is ≥1.

If mixtures of different siloxanes are used as organosilicon component (A), the mixing is preferably carried out at elevated temperature, more preferably at 50° C. to 100° C. To remove any solvent traces present as a result of the production process, mixing may be carried out at elevated temperature and simultaneously under reduced pressure.

The organosilicon component (A) preferably contains both Si-bonded hydroxyl groups and Si-bonded ($R^1O$) groups, where $R^1$ is defined as indicated in formula (I).

The organosilicon component (A) preferably contains not more than 40 wt %, more preferably 1 to 30 wt %, and most preferably 5 to 20 wt %, of Si-bonded ($R^1O$) groups, where $R^1$ is defined as indicated in formula (I).

The component (A) preferably comprises siloxanes (A1) consisting of units of the formula $$R_a(OH)_b(R^1O)_c SiO_{(4-a-b-c)/2} \quad (I),$$

in which
R may be identical or different and is a monovalent, SiC-bonded, optionally substituted hydrocarbon radical having 1 to 18 C atoms, a divalent, optionally substituted, SiC-bonded hydrocarbon radical having 1 to 18 C atoms, or Si-bonded halogen atom,
$R^1$ may be identical or different and is a monovalent, optionally substituted hydrocarbon radical,
a is 0, 1, 2 or 3, preferably 0, 1 or 2,
b is 0, 1, 2 or 3, preferably 0, 1 or 2, more preferably 0 or 1, and
c is 0, 1, 2 or 3,
with the proviso that in formula (I) the sum a+b+c<4, in the siloxanes (A1) in each case the degree of branching, defined as the ratio of the sum of the units of the formula (I) where a is 0 or 1 to the sum of all units of the formula (I), is at least 0.5, the siloxanes (A1) have at least one unit of the formula (I) with b+c≥1, and in the siloxanes (A1), in at least 1% of all units of the formula (I) the sum b+c is ≥1.

The component (A) consists preferably to an extent of 80 wt %, more preferably 100 wt %, of siloxanes (A1).

Examples of siloxanes which may be present in component (A) are $(MeSiO_{3/2})_{0.88}(MeSi(OH)O_{2/2})_{0.05}(MeSi(OEt)O_{2/2})_{0.06}$
  $(Me_2SiO_{2/2})_{0.01}$
with Mw=6600 g/mol, Mn=2000 g/mol and Mw/Mn=3.3;
$(MeSiO_{3/2})_{0.81}(MeSi(OH)O_{2/2})_{0.03}(MeSi(OMe)O_{2/2})_{0.16}$
with Mw=5400 g/mol, Mn=1900 g/mol and Mw/Mn=2.8;
$(MeSiO_{3/2})_{0.86}(MeSi(OH)O_{2/2})_{0.02}(MeSi(OEt)O_{2/2})_{0.10}$
  $(Me_2SiO_{2/2})_{0.02}$
with Mw=10000 g/mol, Mn=2300 g/mol and Mw/Mn=4.3;
$(MeSiO_{3/2})_{0.81}(MeSi(OH)O_{2/2})_{0.04}(MeSi(OEt)O_{2/2})_{0.05}$
  $(Me_2SiO_{2/2})_{0.10}$
with Mw=6500 g/mol, Mn=1900 g/mol and Mw/Mn=3.4;
$(MeSiO_{3/2})_{0.88}(MeSi(OH)O_{2/2})_{0.05}(MeSi(OMe)O_{2/2})_{0.06}$
  $(Me_2SiO_{2/2})_{0.01}$
with Mw=6700 g/mol, Mn=2100 g/mol and Mw/Mn=3.2;
$(MeSiO_{3/2})_{0.88}(MeSi(OH)O_{2/2})_{0.05}(MeSi(OMe)O_{2/2})_{0.06}$
  $(Me_2SiO_{2/2})_{0.01}$
with Mw=9000 g/mol, Mn=2300 g/mol and Mw/Mn=3.9;
$(MeSiO_{3/2})_{0.33}(MeSi(OH)O_{2/2})_{0.05}(MeSi(OEt)O_{2/2})_{0.01}$ $(Me_2SiO_{2/2})_{0.06}$
$(PhSiO_{3/2})_{0.24}(PhSi(OH)O_{2/2})_{0.28}(PhSi(OEt)O_{2/2})_{0.03}$
with Mw=3300 g/mol, Mn=1300 g/mol and Mw/Mn=2.5;
$(MeSiO_{3/2})_{0.75}(PhSiO_{3/2})_{0.05}(MeSi(OH)O_{2/2})_{0.05}(PhSi(OH)O_{2/2})_{0.04}$
$(MeSi(OEt)O_{2/2})_{0.05}(PhSi(OEt)O_{2/2})_{0.03}(Me_2SiO_{2/2})_{0.03}$
with Mw=5600 g/mol, Mn=1800 g/mol and Mw/Mn=3.1;
$(MeSiO_{3/2})_{0.34}(MeSi(OH)O_{2/2})_{0.03}(MeSi(OEt)O_{2/2})_{0.02}(PhSiO_{3/2})_{0.45}$
$(PhSi(OH)O_{2/2})_{0.13}(PhSi(OEt)O_{2/2})_{0.03}$
with Mw=4700 g/mol, Mn=1800 g/mol and Mw/Mn=2.6;
$(MeSiO_{3/2})_{0.27}(MeSi(OH)O_{2/2})_{0.03}(PhSiO_{3/2})_{0.34}(PhSi(OH)O_{2/2})_{0.14}$
$PhSi(OEt)O_{2/2})_{0.02}(PhMeSiO_{2/2})_{0.17}(PhMeSi(OH)O_{1/2})_{0.03}$
with Mw=2400 g/mol, Mn=1200 g/mol and Mw/Mn=2.0;
$(PhSiO_{3/2})_{0.45}(PhSi(OH)O_{2/2})O_{0.44}PhSi(OEt)O_{2/2})_{0.09}$
$(PhSi(OH)_2O_{1/2})_{0.02}$
with Mw=2900 g/mol, Mn=1500 g/mol and Mw/Mn=1.9;
$(PhSiO_{3/2})_{0.48}(PhSi(OH)O_{2/2})_{0.17}(PhSi(OEt)O_{2/2})_{0.02}$
$(CH_3(CH_2)_2SiO_{3/2})_{0.25}(CH_3(CH_2)_2Si(OH)O_{2/2})_{0.08}$
with Mw=1800 g/mol, Mn=1300 g/mol and Mw/Mn=1.4;
$(MeSiO_{3/2})_{0.32}(MeSi(OH)O_{2/2})_{0.06}(MeSi(OEt)O_{2/2})_{0.01}$
$(Me_2SiO_{2/2})_{0.06}$
$(PhSiO_{3/2})_{0.23}(PhSi(OH)O_{2/2})_{0.29}(PhSi(OEt)O_{2/2})_{0.03}$
with Mw=1700 g/mol, Mn=1200 g/mol and Mw/Mn=1.4;
$(PhSiO_{3/2})_{0.50}(PhSi(OH)O_{2/2})_{0.15}(PhSi(OEt)O_{2/2})_{0.02}$
$(CH_3(CH_2)_2SiO_{3/2})_{0.26}(CH_3(CH_2)_2Si(OH)O_{2/2})_{0.07}$
with Mw=2800 g/mol, Mn=1200 g/mol and Mw/Mn=2.3;
$(MeSiO_{3/2})_{0.37}(MeSi(OEt)O_{2/2})_{0.46}(MeSi(OEt)_2O_{1/2})_{0.17}$
with Mw=2400 g/mol, Mn=900 g/mol and Mw/Mn=2.7;
$(MeSiO_{3/2})_{0.38}(MeSi(OEt)O_{2/2})_{0.46}(MeSi(OEt)_2O_{1/2})_{0.15}$
$(Me_2SiO_{2/2})_{0.01}$
with Mw=2800 g/mol, Mn=1000 g/mol and Mw/Mn=2.8;
$(MeSiO_{3/2})_{0.30}(MeSi(OMe)O_{2/2})_{0.47}(MeSi(OMe)_2O_{1/2})_{0.23}$
with Mw=2300 g/mol, Mn=600 g/mol and Mw/Mn=3.8;
$(MeSiO_{3/2})_{0.32}(MeSi(OMe)O_{2/2})_{0.48}(MeSi(OMe)_2O_{1/2})_{0.20}$
with Mw=3300 g/mol, Mn=900 g/mol and Mw/Mn=3.7;
$(PhSiO_{3/2})_{0.23}(PhSi(OMe)O_{2/2})_{0.51}(PhSi(OMe)_2O_{1/2})_{0.26}$
with Mw=1000 g/mol, Mn=700 g/mol and Mw/Mn=1.4;
$(MeSiO_{3/2})_{0.10}(MeSi(OMe)O_{2/2})_{0.17}(MeSi(OMe)_2O_{1/2})_{0.03}$
$(PhSiO_{3/2})_{0.15}$
$(PhSi(OMe)O_{2/2})_{0.31}(PhSi(OMe)_2O_{1/2})_{0.20}(Me_2SiO_{2/2})_{0.04}$
with Mw=1800 g/mol, Mn=900 g/mol and Mw/Mn=2.0;
$(MeSiO_{3/2})_{0.10}(MeSi(OMe)O_{2/2})_{0.15}(MeSi(OMe)_2O_{1/2})_{0.03}$
$(MeSi(O(CH_2)_3CH_3)O_{2/2})_{0.03}(PhSiO_{3/2})_{0.15}(PhSi(OMe)O_{2/2})_{0.24}$
$(PhSi(OMe)_2O_{1/2})_{0.15}(PhSi(O(CH_2)_3CH_3)O_{2/2})_{0.06}$
$(PhSi(OMe)(O(CH_2)_3CH_3)O_{1/2})_{0.04}(PhSi(O(CH_2)_3CH_3)_2O_{1/2})_{0.01}$
$(Me_2SiO_{2/2})_{0.04}$
with Mw=1400 g/mol, Mn=800 g/mol and Mw/Mn=1.8;
$(MeSiO_{3/2})_{0.31}(MeSi(OEt)O_{2/2})_{0.34}(MeSi(OEt)_2O_{1/2})_{0.10}$
$(Me_2SiO_{2/2})_{0.22}(Me_2Si(OEt)O_{1/2})_{0.03}$
with Mw=4500 g/mol, Mn=1900 g/mol and Mw/Mn=2.4;
$(MeSiO_{3/2})_{0.71}(MeSi(OH)O_{2/2})_{0.03}(MeSi(OEt)O_{2/2})_{0.05}$
$(Me_2SiO_{2/2})_{0.21}$
with Mw=5400 g/mol, Mn=2200 g/mol and Mw/Mn=2.5;
$(i-OctSiO_{3/2})_{0.02}(i-OctSi(OMe)O_{2/2})_{0.04}(i-OctSi(Me)_2O_{1/2})_{0.03}$
$(MeSiO_{3/2})_{0.50}(MeSi(OEt)O_{2/2})_{0.40}(MeSi(OH)O_{2/2})_{0.01}$
with Mw=6100 g/mol, Mn=1500 g/mol and Mw/Mn=4.2;
$(i-OctSi(OMe)O_{2/2})_{0.1}(i-OctSi(OMe)_2O_{1/2})_{0.16}$
$(MeSiO_{3/2})_{0.26}$
$(MeSi(OMe)O_{2/2})_{0.36}(MeSi(OMe)_2O_{1/2})_{0.11}$.
with Mw=3000 g/mol, Mn=1500 g/mol and Mw/Mn=2.0;
$(Si(OEt)_2O_{2/2})_{0.42}(Si(OEt)O_{3/2})_{0.19}(Si(OEt)_3O_{1/2})_{0.39}$
with Mw=1000 g/mol, Mn=800 g/mol and Mw/Mn=1.2;
$(Si(OEt)_2O_{2/2})_{0.48}(Si(OEt)O_{3/2})_{0.35}(Si(OEt)_3O_{1/2})_{0.09}$
$(SiO_{4/2})_{0.08}$
with Mw=1400 g/mol, Mn=900 g/mol and Mw/Mn=1.6;
$(i-OctSi(OMe)O_{2/2})_{0.09}(i-OctSiO_{3/2})_{0.06}$ $(i-OctSi(OMe)_2O_{1/2})_{0.08}$
$(MeSiO_{3/2})_{0.23}(MeSi(OMe)O_{2/2})_{0.35}(MeSi(OMe)_2O_{1/2})_{0.19}$
with Mw=1400 g/mol, Mn=600 g/mol and Mw/Mn=2.3;
$(i-OctSi(OMe)O_{2/2})_{0.12}(i-OctSiO_{3/2})_{0.05}(i-OctSi(OMe)_2O_{1/2})_{0.08}$
$(MeSiO_{3/2})_{0.22}(MeSi(OMe)O_{2/2})_{0.33}(MeSi(OMe)_2O_{1/2})_{0.20}$
with Mw=1600 g/mol, Mn=700 g/mol and Mw/Mn=2.3;
$(i-OctSi(OMe)O_{2/2})_{0.11}(i-OctSiO_{3/2})_{0.05}(i-OctSi(OMe)_2O_{1/2})_{0.08}$
$(MeSiO_{3/2})_{0.22}(MeSi(OMe)O_{2/2})_{0.33}(MeSi(OMe)_2O_{1/2})_{0.20}$
$(i-OctSi(OH)O_{2/2})_{0.01}$
with Mw=1500 g/mol, Mn=700 g/mol and Mw/Mn=2.1;
$(SiO_{4/2})_{0.50}(Me_3SiO_{1/2})_{0.39}(Si(OEt)O_{3/2})_{0.06}(Si(OEt)_2O_{2/2})_{0.02}$
$(Si(OEt)_3O_{1/2})_{0.01}(Si(OH)O_{3/2})_{0.02}$
with Mw=7400 g/mol, Mn=3100 g/mol and Mw/Mn=2.4;
$(SiO_{4/2})_{0.45}(Me_3SiO_{1/2})_{0.43}(Si(OEt)O_{3/2})_{0.07}(Si(OEt)_2O_{2/2})_{0.02}$
$(Si(OEt)_3O_{1/2})_{0.01}(Si(OH)O_{3/2})_{0.02}$
with Mw=1400 g/mol, Mn=900 g/mol and Mw/Mn=1.6;
$(SiO_{4/2})_{0.45}(Me_3SiO_{1/2})_{0.36}$ $(ViMe_2SiO_{1/2})_{0.06}(Si(OEt)O_{3/2})_{0.06}$
$(Si(OEt)_2O_{2/2})_{0.02}(Si(OEt)_3O_{1/2})_{0.01}(Si(OH)O_{3/2})_{0.04}$
with Mw=5300 g/mol, Mn=2600 g/mol and Mw/Mn=2.0; and
$(SiO_{4/2})_{0.38}(Me_3SiO_{1/2})_{0.42}(ViMe_2SiO_{1/2})_{0.06}(Si(OEt)O_{3/2})_{0.07}$
$(Si(OEt)_2O_{2/2})_{0.02}(Si(OEt)_3O_{1/2})_{0.01}(Si(OH)O_{3/2})_{0.04}$
with Mw=2600 g/mol, Mn=1600 g/mol and Mw/Mn=1.6;
$(MeSiO_{3/2})_{0.65}(MeSi(OH)O_{2/2})_{0.01}(MeSi(OEt)O_{2/2})_{0.27}$
$(MeSi(OEt)_2O_{1/2})_{0.01}(PhSiO_{3/2})_{0.02}(PhSi(OEt)O_{2/2})_{0.04}$
with Mw=10300 g/mol, Mn=2100 g/mol and Mw/Mn=4.9; and
$(MeSiO_{3/2})_{0.66}(MeSi(OEt)O_{2/2})_{0.27}(MeSi(OEt)_2O_{1/2})_{0.01}$
$(PhSiO_{3/2})_{0.02}(PhSi(OEt)O_{2/2})_{0.04}$
with Mw=16300 g/mol, Mn=2300 g/mol and Mw/Mn=7.1;
where Me is methyl radical, Et is ethyl radical, Vi is vinyl radical, i-oct is 2,4,4-trimethylpentyl radical, and Ph is phenyl radical.

The siloxanes which may be present in the organosilicon component (A) preferably have a weight-average Mw of preferably 500 to 20 000 g/mol, more preferably of 500 to 12 000 g/mol, and most preferably of 700 to 9000 g/mol.

The siloxanes which may be present in the organosilicon component (A) preferably have a number-average Mn of preferably 200 to 8000 g/mol, more preferably of 200 to 5000 g/mol, and most preferably of 500 to 3000 g/mol.

The siloxanes which may be present in the organosilicon component (A) preferably have polydispersities Mw/Mn of 1 to 6, more preferably of 1 to 5.

In the present invention, weight average Mw and number average Mn, rounded to whole 100 figures in accordance with DIN 1333:1992-02 section 4, are determined by gel permeation chromatography (GPC) or size exclusion chromatography (SEC) in accordance with DIN 55672-1 using polystyrene standard and refractive index detector (RI detector). Unless otherwise indicated, THF is used as the eluent for phenyl-containing components, and toluene as the eluent for non-phenyl-containing components, and the analyses are conducted at a column temperature of 45° C. The polydispersity is the ratio Mw/Mn.

Organosilicon component (A) may be either solid or liquid at 23° C. and 1013 hPa.

The inventively used compounds of organosilicon component (A) are already known and can be prepared by any desired methods known. These methods include selection and appropriate combination of the reactions of hydrolysis, alcoholysis, condensation, and equilibration, such as, for example, alcoholysis of chlorosilanes, optionally with subsequent hydrolysis and subsequent condensation, or by hydrolysis and condensation of mixtures of the corresponding chlorosilanes, alkoxysilanes or partially alkoxylated chlorosilanes. The desired silicone units are used preferably in the form of the chlorosilanes as reactants for the synthesis, as starting materials. In the case of the alcoholysis, preference is given to using methanol or ethanol.

The inventively used compounds of organosilicon component (A) are preferably preparable by alcoholysis, hydrolysis, and condensation or trichloro- and/or tetrachlorosilanes, optionally in a mixture with dichlorosilane and/or chlorosilane, in which case the corresponding alcohol is used in stoichiometric excess for the alcoholysis and water is used in stoichiometric deficit for the hydrolysis, based in each case on Si—Cl bonds originally present; or by hydrolysis of trialkoxy- and/or tetraalkoxysiloxanes, optionally in a mixture with dialkoxysiloxanes and/or alkoxysiloxanes, in which case water is used in stoichiometric excess in the case of the hydrolysis, based on Si-alkoxy bonds originally present. The reactions may be carried out either without or else in the presence of a solvent which is inert toward the components used, such as, for example, toluene, solvents with the trade name "ISOPAR E" or 2-methoxypropyl acetate.

Examples of trichlorosilanes which may be used in preparing the inventively used compounds of the organosilicon component (A) are methyl-, ethyl-, n-propyl-, vinyl-, n-octyl-, 2,4,4-Trimethylpentyl-, cyclo-hexyl-, and phenyl-trichlorosilane, 1,2-bis(trichlorosilyl)ethane, cis,trans-1,2-bis(trichlorosilyl)ethene, 1,2-bis(dichloromethylsilyl)ethane, cis,trans-1,2-bis(dichloromethylsilyl)ethene or mixtures thereof.

Examples of dichlorosilanes which may be used in the preparation of the inventively used compounds of organosilicon component (A) are dimethyl-, diethyl-, ethylmethyl-, methylphenyl-, divinyl-, methylvinyl-, ethylvinyl-, phenylvinyl-, di-(n-octyl)-, methyl-(n-octyl)-, ethyl-(n-octyl)-, phenyl-(n-octyl)-, vinyl-(n-octyl)-, bis(2,4,4-trimethylpentyl)-, methyl-(2,4,4-trimethylpentyl)-, ethyl-(2,4,4-trimethylpentyl)-, phenyl-(2,4,4-trimethylpentyl)-, vinyl-(2,4,4-trimethylpentyl)-, di-(cyclo-hexyl)-, methyl-(cyclo-hexyl)-, ethyl-(cyclo-hexyl)-, phenyl-(cyclo-hexyl)-, vinyl-(cyclo-hexyl)-, and diphenyl-dichlorosilane or mixtures thereof.

Examples of monochlorosilanes which may be used in preparing the inventively used compounds of organosilicon component (A) are trimethyl-, triethyl-, triphenyl-, dimethylphenyl-, methyldiphenyl-, dimethylvinyl-, methyldivinyl-, dimethyl-(cyclo-hexyl)-, and dimethyl-(2,4,4-trimethylpentyl)-chlorosilane or mixtures thereof.

Compounds of organosilicon component (A) are with particular preference preparable by reactions selected from alcoholysis, hydrolysis, and condensation of
a) methyl-, ethyl-, vinyl-, 2,4,4-trimethylpentyl- or phenyl-trichlorosilane and optionally dimethyl-, diethyl-, diphenyl-, methylethyl-, methylphenyl- or ethylphenyl-dichlorosilane, or
b) tetrachlorosilane and optionally trimethylchlorosilane, or by hydrolysis of
c) methyl-, ethyl-, vinyl-, 2,4,4-trimethylpentyl- or phenyl-trimethoxysiloxane and optionally dimethyl-, diethyl-, diphenyl-, methylethyl-, methylphenyl- or ethylphenyl-dimethoxysilane, or
d) tetramethoxysilane and optionally trimethylmethoxysilane,
or by hydrolysis of
e) methyl-, ethyl-, vinyl-, 2,4,4-trimethylpentyl- or phenyl-triethoxysiloxane and optionally dimethyl-, diethyl-, diphenyl-, methylethyl-, methylphenyl- or ethylphenyl-diethoxysilane, or
f) tetraethoxysilane and optionally trimethylethoxysilane.

The inventively used metal compounds (B) are preferably aluminum(III), bismuth(III), iron(II), iron(III), manganese (II), manganese(III), titanium(III), titanium(IV), vanadium (III), vanadium(IV), vanadium(V), zinc(II), tin(II), tin(IV), zirconium(IV), tantalum(V) or niobium(V) compounds.

The metal compounds (B) comprise at least one organically bonded carbon atom.

The metal compounds (B) may be metal salt compounds (B-1), composed of a metal cation (B-11) and an anionic organic radical (B-12).

Examples of metal cations (B-11) are aluminum(III), bismuth(III), iron(II), iron(III), manganese(II), manganese (III), titanium(III), titanium(IV), vanadium(III), vanadium (IV), vanadium(V), zinc(II), tin(II), tin(IV), zirconium(IV), tantalum(V), and niobium(V) cations.

Metal cation (B-11) is preferably aluminum(III), bismuth (III), iron(II), iron(III), manganese(II), manganese(III), titanium(IV), zinc(II) or zirconium(IV) cations, more preferably aluminum(III), bismuth(III), zinc(II), titanium(IV) or zirconium(IV) cations, more particularly zinc(II), bismuth (III) cations, or aluminum(III).

Examples of anionic organic radicals (B-12) are alkoxide radicals such as the methoxide, ethoxide, n-propoxide, isopropoxide, n-butoxide, isobutoxide, sec-butoxide, tert-butoxide, triethanolaminate, and 2-ethylhexyloxide radicals; carboxylate radicals such as the acetate, formate, n-octoate, 2-ethylhexanoate, 2,4,4-trimethylpentanoate, 2,2,4-trimethylpentanoate, 6-methylheptanoate, oleate, ricinoleate, palmitate, hexoate, hexadecanate, 2-ethylhexanoate, benzoate, 1,4-dibenzoate, stearate, acrylate, laurate, methacrylate, 2-carboxyethylacrylate, oxalate, 10-undecylenate, dodecanoate, citrate, 3-oxopentanoate, 3-oxobutanoate, and neodecanoate radicals; amide radicals such as the dimethylamide, diethylamide, ethylmethylamide, and dipropylamide radicals; the lactate radical; trialkylsiloxy radicals, more particularly trimethylsiloxy and triethylsiloxy radicals, and also carbonate radicals ($O^-$—CO—OR') and carbamate radicals ($O^-$—CO—$NR'_2$), where R' may be identical or different and are monovalent or divalent, optionally substituted hydrocarbon radicals and, furthermore, may be hydrogen, trimethoxysilylpropyl, triethoxysilylpropyl, dimethoxymethylsilylpropyl, diethoxymethylsilylpropyl, N-[3-(trimethoxysilyl)propyl]-2-aminoethyl, N-[3-(triethoxysilyl)propyl]-2-aminoethyl, N-[3-(dimethoxymethylsilyl)propyl]-2-aminoethyl or N-[3-(diethoxymethylsilyl)propyl]-2-aminoethyl radicals.

Examples of metal salt compounds (B-1) inventively used are aluminum(III) ethoxide, aluminum(III) n-propoxide, aluminum(III) isopropoxide, aluminum(III) n-butoxide, aluminum(III) isobutoxide, aluminum(III) tert-butoxide, aluminum(III) sec-butoxide, aluminum(III) 2-ethylhexanoate, aluminum(III) neodecanoate, aluminum(III) stearate, aluminum(III) n-octoate, aluminum(III) 2-ethylhexanoate, bismuth(III) 2-ethylhexanoate, bismuth(III) neodecanoate, bismuth(III) acetate, manganese(II) octoate, manganese(II)

acetate, manganese(II) 2-ethylhexanoate, titanium(IV) ethoxide, titanium(IV) n-propoxide, titanium(IV) isopropoxide, titanium(IV) n-butoxide, titanium(IV) tert-butoxide, titanium(IV) sec-butoxide, titanium(IV) 2-ethylhexyloxide, titanium(IV) triethanolaminate isopropoxide, titanium(IV) tetrakis(diethylamide), titanium(IV) tetrakis(dimethylamide), vanadium(V) oxytri(ethoxide), vanadium(V) oxytri(isopropoxide), vanadium(V) oxytri(n-propoxide), iron(II) acetate, iron(III) tert-butoxide, iron(III) citrate, iron(II) lactate, iron(II) oxalate, iron(III) oxalate, iron(III) 2-ethylhexanoate, zinc(II) acetate, zinc(II) formate, zinc(II) benzoate, zinc(II) 2-ethylhexanoate, zinc(II) n-octoate, zinc(II) stearate, zinc(II) ethoxide, zinc(II) acrylate, zinc(II) methacrylate, zinc(II) oxalate, zinc(II) 10-undecylenate, zinc(II) 3-oxopentanoate, zinc(II) 3-oxobutanoate, zirconium(IV) acetate, zirconium(IV) 2-ethylhexanoate, zirconium(IV) lactate, zirconium(IV) n-butoxide, zirconium(IV) tert-butoxide, zirconium(IV) isopropoxide, zirconium(IV) n-propoxide, zirconium(IV) 2-carboxyethylacrylate, zirconium(IV) tetrakis(diethylamide), zirconium(IV) tetrakis(ethylmethylamide), zirconium(IV) bis(diethylcitrate)-di-n-propoxide, dioctyltin(IV) laurate, di-n-butyltin(IV) laurate, dimethyltin(IV) laurate, di-n-octyltin(IV) acetate, di-n-butyltin(IV) acetate, compound obtainable by reacting di-n-octyltin(IV) acetate with tetraethoxysilane, compound obtainable by reacting di-n-butyltin(IV) acetate with tetraethoxysilane, tin(II) n-octoate, tin(II) acetate, tin(IV) acetate, tin(IV) tert-butoxide, and tin(II) oxalate, tantalum(V) ethoxide, niobium(V) ethoxide, niobium(V) isopropoxide, compounds of the formulae [Ta(OSiEt$_3$)$_5$], [Ta(OEt)$_4$(OSiMe$_3$)], [Nb(OEt)$_2$(OSiMe$_3$)$_3$], and [Nb(OEt)$_4$(OSiMe$_3$)], where Me is the methyl radical and Et is the ethyl radical.

The metal salt compounds (B-1) inventively used are preferably aluminum(III) ethoxide, aluminum(III) n-propoxide, aluminum(III) isopropoxide, aluminum(III) n-butoxide, aluminum(III) isobutoxide, aluminum(III) tert-butoxide, aluminum(III) sec-butoxide, aluminum(III) 2-ethylhexanoate, aluminum(III) neodecanoate, aluminum(III) stearate, aluminum(III) n-octoate, aluminum(III) 2-ethylhexanoate, bismuth(III) 2-ethylhexanoate, bismuth(III) neodecanoate, bismuth(III) acetate, manganese(II) octoate, manganese(II) acetate, manganese(II) 2-ethylhexanoate, titanium(IV) ethoxide, titanium(IV) n-propoxide, titanium(IV) isopropoxide, titanium(IV) n-butoxide, titanium(IV) tert-butoxide, titanium(IV) sec-butoxide, titanium(IV) 2-ethylhexyloxide, titanium(IV) triethanolaminate isopropoxide, titanium(IV) tetrakis(diethylamide), titanium(IV) tetrakis(dimethylamide), zinc(II) acetate, zinc(II) formate, zinc(II) benzoate, zinc(II) 2-ethylhexanoate, zinc(II) octoate, zinc(II) stearate, zinc(II) ethoxide, zinc(II) methoxide, zinc(II) acrylate, zinc(II) methacrylate, zinc(II) oxalate, zinc(II) 10-undecylenate, zinc(II) 3-oxopentanoate, zinc(II) 3-oxobutanoate, zirconium(IV) acetate, zirconium(IV) 2-ethylhexanoate, zirconium(IV) lactate, zirconium(IV) n-butoxide, zirconium(IV) tert-butoxide, zirconium(IV) isopropoxide, zirconium(IV) n-propoxide, zirconium(IV) 2-carboxyethylacrylate, zirconium(IV) tetrakis(diethylamide), zirconium(IV) tetrakis(ethylmethylamide), and zirconium(IV) bis(diethylcitrate)-di-n-propoxide.

The metal salt compounds (B-1) used inventively are more preferably aluminum(III) neodecanoate, aluminum(III) n-octoate, aluminum(III) 2-ethylhexanoate, bismuth(III) 2-ethylhexanoate, bismuth(III) neodecanoate, zinc(II) 2-ethylhexanoate, zinc(II) 3-oxopentanoate, and zirconium(IV) 2-ethylhexanoate.

Components (B-1) inventively used are commercial products and/or are preparable by methods common in chemistry.

Component (B) used inventively may additionally comprise metal chelate compounds (B-2) of the formula (II)

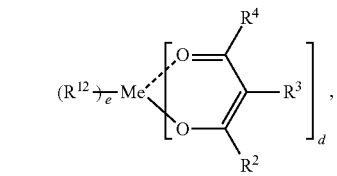

in which
Me is a metal selected from those of main groups 3, 4, and 5 and also transition groups 2, 4, 5, 7, and 8 in the +2 to +5 oxidation state, preferably aluminum(III), bismuth(III), iron(II), iron(III), manganese(II), manganese(III), niobium(V), tantalum(V), titanium(III), titanium(IV), vanadium(III), vanadium(IV), vanadium(V), zinc(II), tin(II), tin(IV) or zirconium(IV),
$R^2$, $R^3$, and $R^4$ each independently of one another are hydrogen, an optionally substituted hydrocarbon radical or an organyloxy radical,
$R^{12}$ may be identical or different and are organyl oxide radicals or oxide radicals,
d is 1, 2, 3 or 4, and
e is 0, 1, 2, 3 or 4,
with the proviso that the sum d+e is 2 to 6.

Examples of hydrocarbon radicals $R^2$, $R^3$, and $R^4$ are, in each case independently of one another, hydrogen, the examples specified for radical R and radical —OR$^1$, and also divalent, optionally substituted hydrocarbon radicals. If $R^2$, $R^3$, and $R^4$ are substituted hydrocarbon radicals, substituents preferred, in each case independently of one another, are halogen atoms, amino groups, ether groups, ester groups, epoxy groups, mercapto groups, and cyano groups.

Preferably the radicals $R^2$ and $R^4$ independently of one another are hydrogen or optionally substituted hydrocarbon radicals having 1 to 18 carbon atoms, more preferably the methyl, ethyl, phenyl, trifluoromethyl, tert-butyl, benzyl or isopropyl radicals, more particularly methyl, ethyl, tert-butyl or isopropyl radicals, or alkoxy radicals such as the methoxy, ethoxy, n-propoxy, isopropoxy, n-butoxy, and phenoxy radicals.

Radical $R^3$ is preferably hydrogen or optionally substituted hydrocarbon radicals having 1 to 18 carbon atoms, more preferably hydrogen, or the methyl or ethyl radical, more particularly hydrogen.

Although not expressed in formula (II), two of the radicals $R^2$, $R^3$, and $R^4$ may have the definition of divalent, optionally substituted hydrocarbon radicals and may together form a ring. For example, $R^4$ and $R^2$ together may form a ring, as in 1,3-cycloheptanedione or 1,3-cyclohexanedione. In addition, $R^3$ and $R^2$ may together form a ring, such as in the esters of salicylic acid, such as benzyl salicylate, phenyl salicylate, ethyl salicylate, 2-ethylhexyl salicylate, 2-hydroxybenzaldehyde, or as in 2-acetylcyclopentanone, 2-acetylcyclohexanone or 2-acetyl-1,3-cyclohexanedione.

Examples of the radicals $R^{12}$ are all alkoxide and amide radicals listed under B-12, and also the oxide radical $O^{2-}$.

Examples of metal chelate compounds (B-2) are aluminum(III) acetylacetonate, aluminum(III) 2,2,6,6-tetramethyl-3,5-heptanedionate, aluminum(III) acetylacetonate bis(ethylacetoacetate), aluminum(III) 9-octadecenylacetoacetate diisopropoxide, aluminum(III)

di(methoxide) ethylacetoacetate, aluminum(III) di(s-butoxide) ethylacetoacetate, aluminum(III) s-butoxide bis(ethylacetoacetate), aluminum(III) methoxide di(ethylacetoacetate), aluminum(III) di(isopropoxide) acetylacetonate, aluminum(III) isopropoxide di(acetylacetonate), aluminum (III) di(isopropoxide) ethylacetoacetate, aluminum(III) isopropoxide di(ethylacetoacetate), aluminum(III) bis(trimethylsiloxide) ethylacetoacetate, aluminum(III) bis (dimethoxymethylsiloxide) ethylacetoacetate, aluminum (III) bis(dimethoxymethylsiloxide) acetylacetonate, aluminum(III) bis(dimethylamide) ethylacetoacetate, aluminum(III) 1,3-propanedioxide ethylacetoacetate, aluminum (III) di(isopropoxide) methylsalicylate, bismuth(III) 2,2,6,6-tetramethyl-3,5-heptanedionate, bismuth(III) acetylacetonate, iron(II) acetylacetonate, iron(III) acetylacetonate, iron(III) 2,2,6,6-tetramethyl-3,5-heptanedionate, iron(II) 2,2,6,6-tetramethyl-3,5-heptanedionate, manganese (II) acetylacetonate, manganese(III) 2,2,6,6-tetramethyl-3,5-heptanedionate, titanium(IV) bis(ethylacetoacetate) di(isobutoxide), titanium(IV) bis(acetylacetonate) di(isopropoxide), titanium(IV) oxide bis(acetylacetonate), titanium(IV) 2,2,6,6-tetramethyl-3,5-heptanedionate, vanadium (III) acetylacetonate, vanadium(IV) oxobis (acetylacetonate), zinc(II) hexafluoroacetylacetonate, zinc (II) 1,3-diphenyl-1,3-propanedionate, zinc(II) 1-phenyl-5-methyl-1,3-hexanedionate, zinc(II) 1,3-cyclohexanedionate, zinc(II) 2-acetylcyclohexanonate, zinc(II) 2-acetyl-1,3-cyclohexanedionate, zinc(II) ethylsalicylate, zinc(II) diethylmalonate, zinc(II) ethylacetoacetate, zinc(II) benzylsalicylate, zinc(II) acetylacetonate, and zinc(II) 2,2,6,6-tetramethyl-3,5-heptanedionate, tin(II) acetylacetonate, zirconium(IV) acetylacetonate, zirconium(IV) 2,2,6,6-tetramethyl-3,5-heptanedionate, zirconium(IV) trifluoroacetylacetonate, and zirconium(IV) hexafluoroacetylacetonate, tantalum(V) acetylacetonate tetraisopropoxide, and tetraethoxytantalum(V) acetylacetonate.

Further examples of chelate ligands which may be present in component (B-2) are found in EP-A 2 388 297, page 16, lines 14 to 43, which is incorporated by reference herein.

Preferably the metal chelate compounds (B-2) used inventively are aluminum(III) acetylacetonate, aluminum(III) 9-octadecenylacetoacetate di(isopropoxide), bismuth(III) 2,2,6,6-tetramethyl-3,5-heptanedionate, bismuth(III) acetylacetonate, titanium(IV) bis(ethylacetoacetate) di(isobutoxide), titanium(IV) bis(acetylacetonate) diisopropoxide, titanium(IV) oxide bis(acetylacetonate), titanium(III) 2,2,6,6-tetramethyl-3,5-heptanedionate, zinc(II) hexafluoroacetylacetonate, zinc(II) 1,3-diphenyl-1,3-propanedionate, zinc(II) 1-phenyl-5-methyl-1,3-hexanedionate, zinc(II) 1,3-cyclohexanedionate, zinc(II) (2-acetylcyclohexanonate, zinc(II) 2-acetyl-1,3-cyclohexanedionate), zinc (II) ethylsalicylate, zinc(II) diethylmalonate, zinc(II) ethylacetoacetate, zinc(II) benzylsalicylate, zinc(II) acetylacetonate or zinc(II) 2,2,6,6-tetramethyl-3,5-heptanedionate.

Component (B-2) are commercial products and/or are preparable by methods common in chemistry.

The nitrogen compounds (C) used inventively are preferably guanidines and/or amidines of the formula (III)

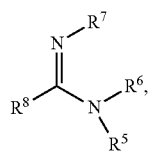

in which
$R^5$, $R^6$, and $R^7$ in each case independently of one another are hydrogen, optionally substituted aliphatic hydrocarbon radicals having 1 to 18 carbon atoms, optionally substituted aromatic hydrocarbon radicals having 6 to 10 carbon atoms, optionally substituted arylaliphatic hydrocarbon radicals having 7 to 20 carbon atoms or optionally substituted cycloaliphatic hydrocarbon radicals having 5 to 18 carbon atoms, with the proviso that not more than two of the radicals $R^5$, $R^6$ or $R^7$ are hydrogen, and in the hydrocarbon radicals a carbon atom may be replaced by a heteroatom, and $R^8$ has a definition specified for radical $R^5$ or is a radical —$NR^5R^6$ or —$NR^5R^9$, in which $R^9$ is

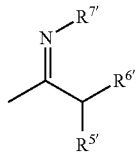

where
$R^{5'}$, $R^{6'}$, and $R^{7'}$ may be identical or different and have a definition specified above for $R^5$, $R^6$, and $R^7$.

If $R^5$, $R^6$, $R^7$, $R^{5'}$, $R^{6'}$, and $R^{7'}$ are substituted hydrocarbon radicals, preferred substituents in each case independently of one another are hydroxyl groups, halogen atoms, amino groups, ether groups, ester groups, epoxy groups, mercapto groups, cyano groups or organosilyl radicals.

In one preferred embodiment the radicals $R^5$, $R^6$, $R^7$, $R^{5'}$, $R^{6'}$, $R^{7'}$, and $R^8$ are each monovalent radicals.

In another preferred embodiment it is possible—although not expressed in formula (III)—for two or more of the radicals $R^5$, $R^6$, $R^7$, and $R^8$ also to be an optionally substituted hydrocarbon radical which has 2 to 8 carbon atoms and a functionality of two or more, and which may be interrupted by heteroatoms.

Preferably both $R^5$ and $R^8$, and also $R^6$ and $R^7$, in each case form a difunctional radical. In another preferred embodiment, $R^6$ and $R^7$ form a difunctional radical, whereas $R^5$ and $R^8$ in each case separately remain monofunctional radicals.

If $R^5$ and $R^8$ together form a difunctional radical, then —$(CH_2)_3$—, —$(CH_2)_4$—, and —$(CH_2)_5$— are preferred.

If $R^6$ and $R^7$ together form a ring, then —$(CH_2)$—, —$(CH_2)_2$—, and —$(CH_2)_3$— are preferred.

More particularly, $R^6$ and $R^7$ together form —$(CH_2)_3$— and at the same time $R^5$ and $R^8$ together form —$(CH_2)_3$—, —$(CH_2)_4$— or —$(CH_2)_5$—.

Where the hydrocarbon radicals with a functionality of two or more are a hydrocarbon radical substituted by heteroatom, the heteroatom is preferably oxygen, nitrogen or sulfur, more preferably nitrogen or oxygen.

The radicals $R^5$ and $R^8$ preferably together form a difunctional radical in which one carbon atom is substituted by a heteroatom. If $R^5$ and $R^8$ together form a difunctional radical in which one carbon atom is replaced by a heteroatom, then —$NH(CH_2)_2$—, —$NH(CH_2)_3$—, —$N(CH_3)(CH_2)_3$— or —$NH(CH_2)_4$— are preferred, the preferred orientation being that in which no N—N bond is formed.

More preferably the radicals $R^5$ and $R^8$ form a difunctional radical in which one carbon atom is replaced by a heteroatom, such as —$NH(CH_2)_2$—, —$NH(CH_2)_3$—, —$N(CH_3)(CH_2)_3$— or —$NH(CH_2)_4$—, and also, at the same time, $R^6$ and $R^7$ together form a difunctional radical —(CH$_2$)$_2$— or —(CH$_2$)$_3$—. More particularly R$^5$ and R$^8$ form —NH(CH$_2$)$_3$— or —N(CH$_3$)(CH$_2$)$_3$—, in which case the NH or N(CH$_3$) as R$^8$ is bonded to carbon atom in accordance with formula (III) and R$^6$ and R$^7$ is —(CH$_2$)$_3$—.

In a further embodiment, R$^6$, R$^8$, and R$^7$ together form a trifunctional radical —(CH$_2$)$_3$—C(—)H—(CH$_2$)$_3$—, in which case the open bond of the middle CH corresponds to the radical R$^8$.

The hydrocarbon radical may also comprise two or more heteroatoms. R$^5$ and R$^6$ may together form a ring, as in azolidine, azetidine, 1,3-diazetidine, 1,3-diazolidine, azonane, 1,3-diazinane, 1,4-diazinane, 1,4-oxazinane, 1,3-oxazinane, azepane, azocane, azonane, azecane, 2,3,4,5-tetrahydropyridine, 1,2,3,4-tetrahydropyridine, 1,2,3,6-tetrahydropyridine, 1-pyrroline, 2-pyrroline, 3-pyrroline or diazepine.

If the radicals R$^5$, R$^6$, R$^7$, R$^{5'}$, R$^{6'}$, and R$^{7'}$ are monovalent radicals, then preferably, in each case independently of one another, they are hydrogen, optionally substituted aliphatic hydrocarbon radicals having 1 to 6 carbon atoms, optionally substituted phenyl radicals, optionally substituted benzyl radicals, optionally substituted cyclopentyl or cyclohexyl radicals, more preferably hydrogen, or the methyl, tert-butyl, or phenyl radicals.

More particularly the radicals R$^{5'}$, R$^{6'}$, and R$^{7'}$ are hydrogen.

Examples of component (C) used inventively are (1-aminoethyl)-2-octyl-2-imidazoline, 1-(1-naphthyl)guanidine, 1-(2,3-xylyl)biguanide, 1-(2,3-xylyl)guanidine, 1-(2,6-xylyl)biguanide, 1-(2,6-xylyl)guanidine, 1-(2-chlorophenyl)biguanide, 1-(2-chlorophenyl)guanidine, 1-(2-ethylhexyl)biguanide, 1-(2-phenylethyl)biguanide, 1-(3,4-dichlorophenyl)-5-(1-methylethyl)biguanide, 1-(3-methylphenyl)biguanide 1-(3-methylphenyl)guanidine, 1-(4-chlorobenzyloxy)biguanide, 1-(4-chlorophenyl)-3-(1-methylethyl)guanidine, 1-(4-chlorophenyl)-5-(1-methylethyl)biguanide, 1-(4-chlorophenyl)biguanide, 1-(4-chlorophenyl)guanidine, 1-(4-methoxyphenyl)biguanide, 1-(4-methoxyphenyl)guanidine, 1-(4-methylphenyl)-3-octylguanidine, 1-(4-methylphenyl)-5-octylbiguanide, 1-(4-methylphenyl)biguanide, 1-(4-methylphenyl)guanidine, 1,2-bis[2-(1-methylethyl)phenyl]guanidine, 1-(4-nitrophenyl)biguanide, 1-(4-nitrophenyl)guanidine, 1-(benzyloxy)guanidine, 1-(hydroxymethyl)biguanide, 1-(2-hydroxyethyl)biguanide, 1-(1-naphthyl)biguanide, 1-(7-hydroxy-1-naphthyl)biguanide, 1-(morpholinosulfonyl)benzylbiguanide, 1-(o-tolyl)biguanide, 1-(o-tolyl)guanidine, 1,1,2,3,3-pentamethylguanidine, 1,1,2-trimethylguanidine, 1,1,3,3-tetramethyl-2-[3-(trimethoxysilyl)propyl]guanidine, 2-[3-(dimethoxy(methyl)silyl)propyl]-1,1,3,3-tetramethylguanidine, 2-[3-(methoxydimethylsilyl)propyl]-1,1,3,3-tetramethylguanidine, 2-[3-(1,1-diethoxy-3,3,3-trimethyldisiloxanyl)propyl]-1,1,3,3-tetramethylguanidine, 1,1,3,3-tetramethyl-2-[3-(tris(prop-1-en-2-yloxy)silyl)propyl]guanidine, 1,1,3,3-tetramethyl-2-[3-(2,5,8-trimethyl-4,6-dioxa-3,7-diaza-5-silanona-2,7-dien-5-yl)propyl]guanidine, 1,3-dimethyl-1,3-diphenyl-2-[2-(3-(tris(ethyl(methyl)amino)silyl)propoxy)ethyl]guanidine, 1,3-dicyclohexyl-2-[3-(triethoxysilyl)propyl]guanidine, 1,1,3,3-tetramethylguanidine (TMG), 1,1,3,3-tetraphenylguanidine, 1,1'-[4-(dodecyloxy)-m-phenylene]bisguanidine, 1,1'-[methylenebis(p-phenylene)]bisguanidine, 1,1-diethylbiguanide, 1,1-dimethylbiguanide, 1,1'-ethylenebisbiguanide, 1,1'-hexamethylenebis[5-(4-chlorophenyl)biguanide], 1,2,3-trimethylguanidine, 1,2-diethyl-1,4,5,6-tetrahydropyrimidine, 1,2-diisopropyl-3-[bis(dimethyl-amino)methylene]guanidine, 1,2-dimethyl-1,4,5,6-tetrahydropyrimidine, 1,3-dibenzylguanidine, 1-di-(o-tolyl)guanidine, 1,3-diphenylbiguanide, 1,3-dimethylguanidine, 1,3-diphenylguanidine, 1,3-diphenyl-1,3-dimethylguanidine, 1,4-diazabicyclo[2.2.2]octane, 1,2-diphenyl-4,5-dihydro-1H-imidazole, 1,4,5,6-tetrahydropyrimidine (THP), 1,5,7-triazabicyclo[4.4.0]dec-5-ene (TBD), 1,5-diazabicyclo[4.4.0]dec-5-ene (DBD), 1,5-diaza-10-methylbicyclo[4.4.0]dec-5-ene, 1,5-diazabicyclo[4.3.0]non-5-ene (DBN), 1,5-diaza-3-methylbicyclo[4.3.0]non-5-ene, 1,5-diazabicyclo[4.2.0]oct-5-ene, 1,5-diazabicyclo[4.4.0]dec-5-ene, 1,5-dibutyl-4,5-dihydro-1H-1,2,4-triazole, 1,5-diphenylbiguanide, 1,5-ethylenebiguanide, 1,8-bis(tetramethylguanidino)naphthalene (TMGN), 1,8-diazabicyclo[5.3.0]dec-7-ene, 1,8-diazabicyclo[5.4.0]undec-7-ene (DBU), 1,9-diazabicyclo-[6.4.0]dodec-8-ene, 1,10-diazabicyclo[7.4.0]tridec-9-ene, 1,14-diazabicyclo[11.4.0]heptadec-13-ene, 1-[3-(dibutylamino)propyl]biguanide, 1-[3-(diethyl-amino)propyl]biguanide, 1-allylbiguanide, 1-benzyl-2,3-dimethylguanidine, 1-benzylaminoguanidine, 1-benzylbiguanide, 1-benzylguanidine, 1-cyclohexylbiguanide, 1-ethyl-2-isopropyl-1,4,5,6-tetrahydropyrimidine, 1-ethyl-2-methyl-1,4,5,6-tetrahydropyrimidine, 1-ethyl-2-n-propyl-1,4,5,6-tetrahydropyrimidine, 1-isopropyl-2-methyl-1,4,5,6-tetrahydropyrimidine, 1-methylbiguanide, 1-methyl-4,5-dihydro-1H-1,2,4-triazole, 1-morpholinobiguanide, 1-n-butylbiguanide, 1-n-butylguanidine, 1-n-butyl-N2-ethylbiguanide, 1-n-octadecylbiguanide, 1-n-propyl-2-methyl-1,4,5,6-tetrahydropyrimidine, 1-phenyl-1-methylbiguanide, 1-phenylbiguanide, 1-phenylguanidine, 1-phenyl-1-methylguanidine, 2-[(5,6,7,8-tetrahydronaphthalene-1-yl)amino]-2-imidazoline, 2-(phenylimino)imidazolidine, 2,3-dimethyl-3,4,5,6-tetrahydropyrimidine, 2,3-dimethylimidazole, 2,3,5,6-tetrahydro-3-phenyl-1H-imidazo[1,2-a]imidazole, 2,6-diazabicyclo[3.2.1]octane, 2,6-diazabicyclo[3.2.0]heptane, 2,6-diazabicyclo[3.3.0]octane, 2,7-diazabicyclo[4.2.0]octane, 2,7-diazabicyclo[3.3.0]octane, 2,7-diazabicyclo[4.3.0]octane, 2,8-diazabicyclo[4.2.0]octane, 2,8-diazabicyclo[4.3.0]nonane, 2-[(3,4-dichlorophenoxy)methyl]-2-imidazoline, 2-benzyl-2-imidazoline, 2-benzylbiguanide, 2-cyclohexyl-1,1,3,3-tetrapropylguanidine, 2-cyclohexyl-2-imidazoline, 2-ethyl-1,1,3,3-tetramethylguanidine, 2-ethyl-2-imidazoline, 2-ethyl-4-methylimidazole, 1-(1H-benzimidazol-2-yl)guanidine, 2-isopropyl-2-imidazoline, 2-methyl-2-imidazoline, 2-methyl-4,5-dihydro-1H-imidazole, 2-methylimidazole, 2-n-octyl-2-imidazoline, 2-n-propyl-2-imidazoline, 2-n-undecyl-2-imidazoline, 2-phenyl-1,3-dicyclohexylguanidine, 2-phenyl-1,1,3,3-tetramethylguanidine, 2-phenyl-2-imidazoline, 2-tert-butyl-1,1,3,3-tetramethylguanidine, 3,3,6,9,9-pentamethyl-2,10-diazabicyclo[4.4.0]dec-1-ene, 3-(2-phenylethyl)biguanide, 3-benzylbiguanide, 3-morpholinobiguanide, 3,6-diazabicyclo[3.2.0]heptane, 3,6-diazabicyclo[3.2.1]octane, 3,7-diazabicyclo[4.2.0]octane, 3,7-diazabicyclo[4.3.0]nonane, 3,8-diazabicyclo[4.3.0]nonane, 3,9-diazabicyclo[4.3.0]nonane, 4,4-diethyl-2-imidazoline, 4,4-dimethyl-2-imidazoline, 4,5-dimethyl-2-imidazoline, 4-ethyl-2-undecyl-2-imidazoline, 4-guanidinobenzoic acid, 5-[3-(2,4,5-trichlorophenoxy)propoxy]-1-isopropylbiguanide, 6-dibutylamino-1,8-diazabicyclo[5.4.0]undec-7-ene (DBA-DBU), 6-hydroxyamino-1,8-diazabicyclo[5.4.0]undec-7-ene (DBU-OH), 7-isopropyl-1,5,7-triazabicyclo[4.4.0]dec-5-ene, 7-methyl-1,5,7-triazabicyclo[4.4.0]dec-5-ene (Me-TBD), 7-n-butyl-1,5,7-triazabicyclo[4.4.0]dec-5-ene, 7-cyclohexyl-1,5,7-triazabicyclo[4.4.0]dec-5-ene, 7-n-propyl-1,5,7-triazabicyclo[4.4.0]dec-5-ene, 7-phenyl-1,5,7-triazabicyclo[4.4.0]dec-5- ene, biguanide, dicyandiamide, guanidine, guanylthiourea, imidazole, N-(2-imidazolin-2-yl)-1-naphthalenamine, N-(2-imidazolin-2-yl)-2,3-xylidine, N-benzyl-2-butyl-1,4,5,6-tetrahydropyrimidine, N-butylimidazole, N-cyclohexyl-2-methyl-1,4,5,6-tetrahydropyrimidine, N-methyl-1,4,5,6-tetrahydropyrimidine, N',N'''-dihexyl-3,12-diimino-2,4,11,13-tetraazatetradecanediamidine, N,N-diamidinoaniline, N,N'-dimethylformamidine, N,N-dimethylformamidine, N,N'-dimethylacetamidine, trimethylacetamidine, N-benzyl-N,N'-dimethylacetamidine, benzamidine, 2-methylbenzamidine, 3,5-difluorobenzamidine, 3-chlorobenzamidine, N,N'-dimethyl-N-ethylbenzamidine, N,N'-dicyclohexyl-N-methylacetamidine, triphenylbenzamidine, N,N'-diphenyl-N'-methylbenzylamidine, (Z)- or (E)-1-butyl-2,3-dicyclohexyl-1,3-dimethylguanidine, (Z)- or (E)-N-butyl-N'-cyclohexyl-N-ethylpiperidine-1-carboximideamide, 2-(2-nonyl-4,5-dihydro-1H-imidazol-1-yl)ethanol, N-(2-(2-butyl-4,5-dihydro-1H-imidazol-1-yl)ethyl)pentanamide, (Z)- or (E)-2,3-diisopropyl-1-methyl-1-[3-(trimethoxysilyl)propyl]guanidine, (Z)- or (E)-1-butyl-2,3-diisopropyl-1-(3-(trimethoxy-silyl)propyl)guanidine, (Z)- or (E)-1-[3-(dimethoxy(methyl)silyl)propyl]-2,3-diisopropyl-1-methylguanidine, (Z)- or (E)-2,3-diisopropyl-1,1-bis(3-(trimethoxysilyl)propyl)guanidine, (Z)- or (E)-2,3-dicyclohexyl-1-methyl-1-(3-(trimethoxysilyl)propyl)-guanidine, 2-(2-hydroxy-2-(3-(trimeth-oxysilyl)propoxy)ethyl)-1,1,3,3-tetramethylguanidine, 2-(2-hydroxy-1-(3-(trimethoxysilyl)propoxy)ethyl)-1,1,3,3-tetramethylguanidine, 2-(2,3,4,6,7,8,9,10-octahydropyrimido[1,2-a]azepin-1-ium-1-yl) 1-(3-(trimethoxysilyl)propoxy)ethanolate, (Z)- or (E)-1-(2-((E)-2,3-diisopropylguanidino)ethyl)-2,3-diisopropyl-1-(3-(triethoxysilyl)propyl)guanidine, and also reaction products obtainable from these nitrogen compounds with 3-glycidyloxypropyltrimethoxysilane or 3-glycidyloxypropyltriethoxysilane.

Preferably the component (C) used in accordance with the invention is 1,5,7-triazabicyclo[4.4.0]dec-5-ene (TBD) and 7-methyl-1,5,7-triazabicyclo[4.4.0]dec-5-ene (Me-TBD), 1,4,5,6-tetrahydropyrimidine (THP), 1,1,3,3-tetramethylguanidine (TMG), 1,5-diazabicyclo[4.4.0]dec-5-ene (DBD), 1,5-diazabicyclo[4.3.0]non-5-ene (DBN), 1,8-diazabicyclo[5.4.0]undec-7-ene (DBU) or 1,8-bis(tetramethylguanidino)naphthalene (TMGN).

Component (C) are commercial products and/or are preparable by methods common in chemistry.

For preparing the compositions of the invention, nitrogen compounds (C) are preferably used in amounts of 0.1 to 10.0 mol, more preferably 0.5 to 4.0 mol, and most preferably 1.0 to 3.0 mol, in each case based on 1.0 mol of metal compound (B).

For preparing the compositions of the invention, nitrogen compounds (C) are preferably used in amounts of preferably 0.01 to 10 parts by weight, more preferably 0.01 to 5 parts by weight, and most preferably 0.05 to 3 parts by weight, in each case based on 100 parts by weight of component (A).

In one preferred embodiment of the present invention, a catalyst preparation (K) is prepared with the components (B) and (C) and optionally with a solvent (D), and is then mixed with component (A) and also, optionally, with further constituents.

The catalyst preparation (K) is prepared preferably by mixing at least one metal compound (B), at least one nitrogen compound (C), optionally in the presence of a solvent (D) or of a mixture of two or more solvents (D).

This mixing may take place at room temperature under the pressure of the surrounding atmosphere, in other words about 900 to 1100 hPa. If desired, however, this mixing may also take place at higher temperatures, as for example at temperatures in the range from 30 to 70° C. It is possible, moreover, to carry out mixing, occasionally or continually, under reduced pressure, such as at 30 to 500 hPa absolute pressure, in order to remove volatile compounds and/or air. A further option is to operate under superatmospheric pressure, such as at pressures between 1100 hPa and 3000 hPa absolute pressure, more particularly in the case of continuous operation, if these pressures, for example, come about in closed systems by the pressure during pumping and by the vapor pressure of the materials used at elevated temperatures.

With particular preference, (B) is first admixed with solvent (D) and the nitrogen compound (C) is added to this mixture. In a further particularly preferred embodiment, first (B) is admixed with solvent (D) and a solution of (C) in solvent (D) is added to this mixture, the solvent (D) being able to be the same in each case or else it being possible for different solvents (D) to be used in each case.

Optionally employed solvent (D) in this context preferably comprises solvents allowing sufficient solubility of the components (B), (C) or the catalyst preparation (K). Examples of such solvents (D) are monohydric and polyhydric alcohols such as methanol, ethanol, n-propanol, isopropanol, n-butanol, isobutanol, sec-butanol, 1,2-ethanediol, 1,2-propanediol, 1,3-propanediol, polypropylene glycol, polyethylene glycol, 1,2-butanediol, 1,3-butanediol, polybutylene glycol, and glycerol; ethers such as methyl tert-butyl ether, di-tert-butyl ether, di-, tri- or tetraethylene glycol dimethyl ether; saturated hydrocarbons such as n-hexane, cyclohexane, n-heptane, n-octane, and isomeric octanes, such as 2-ethylhexane, 2,4,4-trimethylpentane, 2,2,4-trimethylpentane, and 2-methylheptane, and also mixtures of saturated hydrocarbons having boiling ranges between 60-300° C., as obtainable under the trade names Exxsol™, Hydroseal® or Shellsol®; aromatic solvents such as benzene, toluene, o-, m- or p-xylene, solvent naphtha, and mesitylene; acetals such as methylal, ethylhexylal, butylal, 1,3-dioxolane, and glycerol formal; carbonates such as 1,3-dioxolan-2-one, diethyl carbonate, dimethyl carbonate, dipropyl carbonate, propylene glycol carbonate, ethylene carbonate; ketones such as methyl isobutyl ketone, methyl ethyl ketone, methyl isoamyl ketone, diisobutyl ketone, acetone, and cyclohexanone; esters such as ethyl acetate, n-butyl acetate, ethylene glycol diacetate, gamma-butyrolactone, 2-methoxypropyl acetate (MPA), and ethyl ethoxypropionate; amides such as N,N-dimethylformamide, N,N-dimethylacetamide, N-methyl-2-pyrrolidone, and N-ethyl-2-pyrrolidone; acetonitrile; dimethyl sulfoxide; and mixtures thereof.

Particularly preferred solvents (D) are methanol, ethanol, n-propanol, isopropanol, n-hexane, cyclohexane, n-heptane, n-octane, and isomeric octanes, such as 2-ethylhexane, 2,4,4-trimethylpentane, 2,2,4-trimethylpentane, and 2-methylheptane, mixtures of saturated hydrocarbon radicals having boiling ranges between 60 to 300° C., o-, m- or p-xylene, methyl isobutyl ketone, methyl ethyl ketone, acetone, n-butyl acetate, 2-methoxypropyl acetate (MPA) or homogeneous mixtures thereof.

The catalyst preparation (K) is preferably prepared using solvent(s) (D).

The catalyst preparation (K) is preferably prepared by mixing a total of 1.0 mol of metal compounds (B) with 0.1 to 10.0 mol, more preferably 0.5 to 4.0 mol, and most preferably 1.0 to 3.0 mol of nitrogen compounds (C), optionally with solvent (D).

If solvent (D) is used for preparing the catalyst preparation (K), the amounts involved are preferably in each case 0.1 to 10 parts by weight, based on one part by weight of the total amount of (B) and (C).

Instead of or in addition to solvent (D) it is also possible, if desired, to use other components used in any case for preparing the compositions of the invention, provided they are miscible with components (B) and/or (C), examples being organosilicon compounds (A), silanes (F) or organic acids (G). Catalyst preparation (K) at room temperature under the pressure of the surrounding atmosphere preferably comprises solutions.

In addition to components (A), (B), and (C), and also, optionally, (D), the compositions (Z) of the invention may comprise further substances different from components (A), (B), (C), and (D), such as, for example fillers (E), silanes (F), organic acids (G), and further constituents (H).

The optional fillers (E) in the compositions (Z) of the invention may be any desired fillers known to date.

Examples of optionally employed fillers (E) are nonreinforcing fillers, these being fillers having a BET surface area of preferably up to 50 m$^2$/g, such as quartz powders, quartz granules, fused quartz powders, silica sand powders, glass powders, diatomaceous earth; water-insoluble silicates, such as calcium silicate, magnesium silicate, zirconium silicate, talc, kaolin, zeolites; metal oxide powders such as aluminum, titanium, iron or zinc oxides and/or mixed oxides thereof, barium sulfate, calcium carbonate, finely ground marble, gypsum, silicon nitride, silicon carbide, boron nitride, powdered polymers, such as polyacrylonitrile powders; reinforcing fillers, these being fillers having a BET surface area of more than 50 m$^2$/g, such as pyrogenically prepared silica, precipitated silica, precipitated chalk, carbon black, such as furnace black and acetylene black, and mixed silicon aluminum oxides of high BET surface area; aluminum trihydroxide, magnesium hydroxide, fillers in hollow sphere form, such as ceramic microbeads, examples being those available under the trade name Zeeospheres™ from 3M Deutschland GmbH at Neuss, Germany; fibrous fillers, such as wollastonite, montmorillonite, bentonite, and also cut and/or ground fibers of glass (short glass fibers), mineral wool or plastic. The stated fillers may have been made hydrophobic, by treatment with organosilanes and/or organosiloxanes or with stearic acid, for example.

Preferably the optionally employed fillers (E) are inorganic fillers, more preferably inorganic fillers containing silicon, more particularly those from natural sources, such as quartz, quartz powders, quartz granules, fused quartz powders, crystobalite, talc, or fibrous fillers containing silicon and from natural sources such as montmorillonite and wollastonite, or synthetic products containing silicon, such as silica sand powders, fumed silica, which may be obtained by flame hydrolysis of, for example, tetrachlorosilane in an oxyhydrogen flame, or amorphous quartz (fused silica), which is obtainable by thermal aftertreatment of fumed silica, or are inorganic, fibrous, synthetic fillers containing silicon, such as cut or ground short glass fibers.

Very preferably the optionally employed fillers (E) are quartz powders, quartz granules, fused quartz powders, silica sand powders, cristobalite, cut or ground short glass fibers, montmorillonite, wollastonite or talc, which may optionally have been surface-treated. With preference the optionally employed fillers (E) are not surface-treated.

The optionally employed fillers (E) may be used either each individually or in any desired mixture with one another. As component (E), preference is given to using mixtures of finely divided and coarsely particulate fillers.

The optional finely divided fillers (E) preferably have particle sizes of 0.02 μm to less than 200 μm, more preferably 0.3 μm to 100 μm. In the case of fibrous fillers, this corresponds to the longest extent of the fibers. Employed in particular as finely divided filler (E) is quartz.

The optional coarsely particulate fillers (E) preferably have particle sizes of 0.2 mm to 10 mm, and most preferably of 0.2 mm to 5 mm, more particularly of 0.2 mm to 3 mm. Employed in particular as coarsely particulate filler (E) is quartz.

Optional component (E) preferably consists to an extent of at least 20 wt % of coarsely particulate fillers having particle sizes of 0.2 mm to 10 mm, more preferably to an extent of 40 to 80 wt % of coarsely particulate fillers having particle sizes of 0.2 to 10 mm, based in each case on the total amount of (E).

The particle size distribution of particles >500 μm is preferably analyzed using an Alpine e200 LS air jet sieve with analytical sieves meeting the requirements of DIN ISO 3310-1. Analysis of the particle size distribution in the range from about 0.02 to 500 μm is carried out preferably with a Cilas 1064 Particle Size Analyzer from Cilas.

If the compositions (Z) of the invention include fillers (E), the amounts are preferably in total 70 to 99 parts by weight, more preferably from 75 to 95 parts by weight, and most preferably from 85 to 95 parts by weight, based in each case on 100 parts by weight of the composition. The compositions (Z) of the invention preferably do comprise fillers (E).

Examples of optionally employed component (F) are organosilicon compounds of the formula

$$R^{14}{}_x(R^{13}O)_{4-x}Si \qquad (IV),$$

where
$R^{14}$ may be identical or different and is a monovalent, SiC-bonded, optionally substituted hydrocarbon radical, a divalent SiC-bonded hydrocarbon radical or Si-bonded halogen atom,
$R^{13}$ may be identical or different and is a monovalent, optionally substituted hydrocarbon radical, and
x is 0, 1, 2 or 3, preferably 0 or 1.

Examples and preferred ranges for radical $R^{14}$ are the examples and preferred ranges specified for radical R.

Examples and preferred ranges for radical $R^{13}$ are the examples and preferred ranges specified for radical $R^1$.

Examples of organosilicon compounds (F) are organoalkoxysilanes such as methyltrimethoxysilane, methyltriethoxysilane, vinyltrimethoxysilane, vinyltriethoxysilane, phenyltrimethoxysilane, phenyltriethoxysilane, n-butyltrimethoxysilane, n-butyl-triethoxysilane, isobutyltrimethoxysilane, isobutyl-triethoxysilane, tert-butyltrimethoxysilane, tert-butyl-triethoxysilane, n-octyltrimethoxysilane, n-octyltriethoxysilane, (2,4,4-trimethylpentyl)trimethoxysilane, (2,4,4-trimethylpentyl)triethoxysilane, n-hexa-decyltrimethoxysilane, n-hexadecyltriethoxysilane, n-nonacosyltriethoxysilane, n-nonacosyltrimethoxysilane, n-triacontyltrimethoxysilane, n-triacontyltriethoxysilane, cyclohexyltrimethoxysilane, cyclohexyltriethoxysilane, methylvinyldimethoxysilane, methylvinyldiethoxysilane, n-hexadecylmethyldimethoxysilane, n-hexadecylmethyldiethoxysilane, (2,4,4-trimethylpentyl)methyldimethoxysilane, (2,4,4-trimethylpentyl)methyldiethoxysilane, n-octylmethyldi-methoxysilane, n-octylmethyldiethoxysilane, (cyclohexyl)methyldimethoxysilane, (cyclohexyl)methyldiethoxysilane, tris[3-(trimethoxysilyl)propyl]isocyanurate, tris[3-(triethoxysilyl)propyl]isocyanurate, tetraethoxysilane or tetramethoxysilane, or functional silanes, such as methacryloyloxymethyltriethoxysilane, methacryloyloxymethyltrimethoxysilane, (methacryloyloxymethyl)methyldiethoxysilane, (methacryloyloxymethyl) methyldimethoxysilane, 3-methacryloyloxypropyl-trimethoxysilane, 3-methacryloyloxypropyltriethoxysilane, N-trimethoxysilylmethyl O-methylcarbamate, N-triethoxysilylmethyl O-methylcarbamate, N-dimethoxy-(methyl)silylmethyl O-methylcarbamate, N-diethoxy-(methyl)silylmethyl O-methylcarbamate, 3-glycidyloxypropyltrimethoxysilane, 3-glycidyloxypropyltriethoxysilane, 3-(triethoxysilyl)propylsuccinic anhydride, and 3-mercaptopropyltrimethoxysilane, 3-mercaptopropyl-triethoxysilane, 3-aminopropyltriethoxysilane, 3-amino-propyltrimethoxysilane, 3-(2-aminoethyl)aminopropyltriethoxysilane, and 3-(2-aminoethyl)aminopropyltri-methoxysilane.

Organosilicon compounds (F) optionally used are preferably preparable by methods known from the literature, such as by alcoholysis of the corresponding organylchlorosilanes, for example, or from tetrachlorosilane.

If the compositions of the invention do comprise organosilicon compounds (F), the amounts are preferably 0.5 to 100 parts by weight, more preferably 0.5 to 50 parts by weight, and most preferably 0.5 to 35 parts by weight, based in each case on 100 parts by weight of the organosilicon component (A). The compositions of the invention preferably do comprise organosilicon compounds (F).

Examples of optionally employed organic acids (G) are aliphatic linear or branched, optionally substituted monocarboxylic, dicarboxylic or tricarboxylic acids having to 22 carbon atoms in the alkyl radical, or aromatic, optionally substituted monocarboxylic or dicarboxylic acids having 6 to 12 carbon atoms, such as formic acid, acetic acid, n-octanoic acid, 6-methylhexanoic acid, 2,4,4-trimethylpentanoic acid, 3,4,4-trimethylpentanoic acid, 2-ethylhexanoic acid, oleic acid, stearic acid, lauric acid, myristic acid, palmitic acid, caproic acid, neodecanoic acid, benzoic acid, terephthalic acid, phthalic acid, isophthalic acid, acrylic acid, methacrylic acid, oxalic acid, fumaric acid, succinic acid, malonic acid, maleic acid, undec-10-enoic acid and undecanoic acid; 2-oxo- and 3-oxocarboxylic acids, such as 2-oxopropanoic acid, 3-oxobutanoic acid, and acetonedicarboxylic acid; and also hydroxycarboxylic acids, such as D,L-tartaric acid, mesotartaric acid, 4-hydroxybutyric acid, ricinoleic acid, 12-hydroxystearic acid, and citric acid.

Preferred acids (G) are n-octanoic acid, 2-ethylhexanoic acid, lauric acid, myristic acid, caproic acid, neodecanoic acid, malonic acid, 3-oxobutanoic acid, acetonedicarboxylic acid, D,L-tartaric acid, mesotartaric acid, 4-hydroxybutyric acid or citric acid.

If the compositions (Z) of the invention do comprise organic acids (G), the amounts involved are preferably 0.1 to 10 mol of carboxylic acid groups, more preferably 0.1 to 5 mol of carboxylic acid groups, more particularly 0.5 to 2 mol of carboxylic acid groups, based in each case on 1 mol of component (C).

Examples of optionally employed further constituents (H) are pigments, odorants, oxidation inhibitors, siloxanes different from siloxanes (A1), agents for influencing the electrical properties, flame retardants, all other substances useful in crosslinkable compositions, such as, for example silicates water-soluble at room temperature under a pressure of 900 to 1100 hPa, such as sodium orthosilicate, disodium disilicate, disodium trisilicate, potassium silicate; water, including adsorbed water, water adsorbed on zeolites, cyclodextrins, or bound as water of crystallization in salts such as sodium sulfate decahydrate, aluminum sulfate octadecahydrate, calcium sulfate dihydrate, disodium metasilicate nonahydrate, and disodium metasilicate pentahydrate.

Examples of optionally employed pigments (H) are inorganic pigments such as iron oxides (yellow, black, red), chromium(III) oxide, titanium dioxide, and carbon black; dyes, such as phthalocyanines and azo compounds; effect pigments for generating a metallic effect such as flakes of gold, silver, copper, aluminum, silicon, mica, optionally coated for example with $FeTiO_3$, $Fe_2O_3$, $TiO_2$, or liquid-crystal pigments for generating a goniochromatic color effect. The pigments may be used in powder form or in dispersion in a suitable liquid, preferably in liquid component (A), (F) and/or (G). Furthermore, the pigments may be used in the form of a surface coating applied to the coarsely particulate fillers.

Examples of siloxanes (H) are substantially linear polydiorganosiloxanes which are free from Si-bonded hydroxyl groups and free from Si-bonded organyloxy groups, such as, for example, polydiorganosiloxanes terminated by trimethylsilyl groups; and also substantially linear polydiorganosiloxanes having terminal Si-bonded hydroxyl groups and/or organyloxy groups, such as trimethoxysilyl, triethoxysilyl, methyldimethoxysilyl, and methyldiethoxysilyl groups, where the substantially linear polydiorganosiloxanes have preferably more than 50%, more preferably more than 60%, of diorganosilyl units, based on the total number of the siloxane units per molecule.

If the compositions (Z) of the invention do comprise siloxanes (H), the amounts involved are 1 to 20 parts by weight, preferably 1 to 10 parts by weight, based in each case on 100 parts by weight of component (A). Siloxanes (H) are preferably used when component (A) consists of siloxanes (A1).

If the compositions of the invention comprise further constituents (H) other than siloxanes (H), the amounts involved are preferably 1 to 100 parts by weight, more preferably 1 to 50 parts by weight, more particularly 1 to 20 parts by weight, based in each case on 100 parts by weight of component (A).

The compositions (Z) of the invention are preferably compositions comprising
(A) organosilicon component,
(B) metal compound,
(C) nitrogen compound,
optionally (D) solvents,
(E) fillers,
optionally (F) silanes,
optionally (G) organic acids, and
optionally (H) further constituents.

The compositions (Z) of the invention are more preferably compositions comprising
(A) organosilicon component,
(B) metal compound,
(C) nitrogen compound,
optionally (D) solvents,
(E) fillers,
(F) silanes,
optionally (G) organic acids, and
optionally (H) further constituents.

The compositions (Z) of the invention are very preferably compositions comprising
(A) organosilicon component,
(B) metal compound,
(C) nitrogen compound,
optionally (D) solvents,
(E) fillers,
(F) silanes,
(G) organic acids, and
optionally (H) further constituents.

Another preferred variant of the compositions (Z) of the invention are those comprising
(A1) organosiloxanes,
(B) metal compound,
(C) nitrogen compound,
optionally (D) solvents,
(E) fillers,
(F) silanes,
optionally (G) organic acids,
(H) siloxanes, and
optionally (H) other constituents different from siloxanes (H).

In a further preferred variant, the compositions (Z) of the invention are compositions comprising
(A) organosilicon component,
(B) metal compound,
(C) nitrogen compound,
optionally (D) solvents,
(E) fillers in amounts of 70 to 99 parts by weight, based on 100 parts by weight of the composition (Z),
optionally (F) silanes,
optionally (G) organic acids, and
optionally (H) further constituents.

The compositions (Z) of the invention are very preferably compositions comprising
(A) organosilicon component,
(B) metal compound,
(C) nitrogen compound,
optionally (D) solvents,
(E) fillers in amounts of 70 to 99 parts by weight, based on 100 parts by weight of the composition (Z), with the proviso that component (E) consists at least to an extent of 20 wt % of coarsely particulate fillers having particle sizes of 0.2 mm to 10 mm, based on the total amount of (E),
optionally (F) silanes,
optionally (G) organic acids, and
optionally (H) further constituents.

The fraction of components (A), (B), (C), (D), (E), (F), (G), and (H) in the composition (Z) of the invention is preferably 95 to 100 wt %.

In particular, for producing the compositions (Z) of the invention, apart from the constituents (A), (B), (C), (D), (E), (F), (G), and (H), no further constituents are used.

The components used in accordance with the invention may in each case comprise one kind of such component or else a mixture of at least two kinds of a respective component.

A further subject of the present invention is a method for producing the compositions of the invention by mixing of the individual components in any order and in a conventional manner.

With the method of the invention, preferably a premix is prepared from organosilicon component (A) and also, optionally silane (F) and optionally siloxane (H), this premix is subsequently mixed with the preparation (K), and thereafter optionally fillers (E) and optionally further constituents (H) are added. The preparation (K) is prepared by mixing metal compound (B) optionally in a solvent (D) with nitrogen compound (C) optionally in a solvent (D) and organic acid (G) optionally in a solvent (D), the solvents (D) in each case being able to be the same or different.

In a further particularly preferred embodiment of the method of the invention, a catalyst preparation (K) can be prepared from metal compound (B), nitrogen compound (C), and also, optionally, solvent (D) and optionally organic acid (G), and this preparation (K) is then mixed with component (A) and also, optionally, further constituents (H) and silane (F).

In one especially preferred embodiment, first of all the coarsely particulate fillers (E) are premixed optionally with pigments (F), after which a mixture of the organosilicon component (A), optionally with organosilicon component (F) and optionally with siloxane (H), is intimately mixed thereto, to which, then, the separately prepared mixture of catalyst preparation (K) and optionally components (F) and optionally (G) is added, followed by finely divided fillers (E).

The mixing may take place at room temperature under the pressure of the surrounding atmosphere, in other words about 900 to 1100 hPa. It is additionally possible to carry out mixing occasionally or continually under reduced pressure, such as at 30 to 500 hPa absolute pressure, for example, in order to remove volatile compounds and/or air. An alternative option is to operate under superatmospheric pressure, such as at pressures between 1100 hPa and 3000 hPa absolute pressure, especially in the case of continuous operation, if, for example, these pressures arise in enclosed systems by the pressure during pumping and by the vapor pressure of the materials used at elevated temperatures.

Mixing preferably takes place at the temperature which comes about from the temperature of the raw materials plus energy input on mixing, these being generally temperatures between 10 and 50° C., more preferably at temperatures of 10 to 40° C., most preferably at temperatures of 15 to 30° C., it being possible to carry out heating or cooling as and when required.

The method of the invention can be carried out continuously, discontinuously or semicontinuously.

The compositions (Z) of the invention in one preferred embodiment are kneadable mixtures of very high viscosity at room temperature, with a puttylike consistency, which can nevertheless be made to flow under correspondingly high mechanical pressure.

In another preferred embodiment, the compositions (Z) of the invention have the consistency of wet sand. They are conveyable, on conveyor belts, for example, and have a storage life sufficient for further processing.

The compositions (Z) of the invention can be brought into any desired form by mechanical pressure at the ambient temperature or, optionally, at elevated temperature.

The compositions of the invention crosslink at ambient temperatures, customarily room temperature, or at temperatures above room temperature, by condensation reaction with elimination of alcohol and optionally water.

The crosslinking of the compositions (Z) of the invention begins as early as on mixing of components (A), (B), and (C), and the optionally employed components (E), (F), (G), and (H). If component (A) contains no Si-bonded hydroxyl groups, water (H) must be added.

By raising the temperature, preferably to 50 to 200° C., more preferably to 80 to 160° C., more particularly at 80 to 130° C., crosslinking is accelerated. Shaping and crosslinking may also be carried out in a joint step.

The compositions (Z) of the invention can be employed for all purposes for which crosslinkable silicone compositions are useful. The mixtures according to the invention are processed by known methods.

A further subject of the present invention are shaped articles produced by crosslinking the compositions (Z) of the invention.

Shaped bodies can be produced from the mixtures according to the invention by means, for example, of the method of transfer molding, which has long been known per se. For this purpose, the mixture is injected by means of mechanical pressure into a corresponding mold cavity. The mold is generally in two parts and is closed by a hydraulic press during the transfer molding procedure. The mold is preheated to the desired temperature, thereby first facilitating the flow of the composition and secondly accelerating the curing. After the end of the transfer molding procedure, the mold is kept closed until the shaped articles have attained a consistency which allows them to be removed without destruction. Mold cavities for test specimens are described for example in DIN EN ISO 10724-1:2002-04.

The shaped articles of the invention are preferably artificial stones.

The procedure for producing artificial stones is preferably as follows: The compositions of the invention are first introduced into a mold, and, in order to prevent gas inclusions, reduced pressure is subsequently applied. Densification may take place as early as in this step, with the composition of the invention preferably being set in vibration via the molds. This is followed by further densification of the composition, by application of mechanical pressure. This compacting process, i.e., the densification optionally with vibration under reduced pressure, lasts preferably 1 to 3 minutes. If the shaped article is being cured in the mold, then the mold, simultaneously with one of the preceding steps or subsequently, is heated for a period of preferably 30 to 120 minutes to temperatures above room temperature, preferably at 50 to 200° C., more preferably at 80 to 160° C., more particularly at 80 to 130° C. Thereafter the shaped article is taken from the mold. Alternatively, and with particular preference, the as yet uncured shaped article may be taken from the mold after the end of shaping, i.e., after mechanical pressing, and may be cured in a subsequent, separate step, in a separate apparatus, at the temperatures and for the times specified above. After that, independently of the curing method, storage is advantageously continued at ambient temperature for a duration of at least one hour, preferably of at least 10 hours, more preferably of 14 to 48 hours. The shaped article obtained accordingly can then be processed further by known methods, such as, for example, by grinding, surface polishing, and cutting.

A further subject of the present invention is a method for producing artificial stone, characterized in that the compositions (Z) of the invention are shaped and allowed to crosslink.

The compositions (Z) of the invention have the advantage in particular that they exhibit a good working time of preferably more than 30 minutes, more preferably more than 45 minutes, most preferably more than 60 minutes, in a temperature range from 18 to 25° C., but nevertheless cure rapidly at elevated temperature, preferably at 80 to 120° C., and the shaped articles obtained accordingly have after just, preferably, 14-48 hours a hardness and flexural strength that are high enough to enable further processing (cutting, grinding, polishing).

The compositions (Z) of the invention have the advantage in particular that through combination with the metal compound (B), a relatively large quantity of nitrogen compound (C) can be used, which is beneficial to the aftercuring and hence to the ultimate hardness and also ultimate flexural strength, i.e., after 30-day storage of the shaped articles at ambient temperature, but the mixtures still always have a long working time.

The mixtures (Z) of the invention and also the shaped articles produced from them have the advantage in particular that they exhibit no discoloration, meaning that they neither have a strong inherent color nor that the shaped articles discolor under UV irradiation, e.g., in a Suntest CPS+ from Atlas Material Testing Technology in accordance with DIN EN ISO 11431:2003-1.

The compositions (Z) of the invention have the advantage in particular that the curing components (B) and (C) can be added from the outset to the organosilicon compound (A) without any detrimental effect on the working time as a result.

The compositions (Z) of the invention have the advantage in particular that they can be produced easily and with very good reproducibility.

In the examples described below, all viscosity figures, unless otherwise indicated, are based on a temperature of 25° C. Unless otherwise indicated, the following examples are carried out under the pressure of the surrounding atmosphere, in other words approximately at 1013 hPa, and at room temperature, in other words at approximately 23° C., or at a temperature which comes about when the reactants are combined at room temperature without additional heating or cooling, and also at a relative atmospheric humidity of about 50%. Furthermore, all data in parts and percentages, unless otherwise indicated, are by weight.

In the present invention, substances are characterized by reporting of data obtained preferably by means of instrumental analysis. The measurements on which these data are based are either carried out in accordance with publicly available standards, or determined according to specially developed methods. In order to ensure the clarity of the teaching imparted, the methods used are specified here:

Viscosity

In the following examples, the dynamic viscosity of the organosilicon compounds is measured in accordance with DIN 53019. The procedure was preferably as follows: Unless otherwise indicated, the viscosity is measured at 25° C. by means of a "Physica MCR 300" rotational rheometer from Anton Paar. For viscosities from 1 to 200 mPa·s, a coaxial cylinder measuring system (CC 27) with an annular measuring gap of 1.13 mm is used, and for viscosities greater than 200 mPa·s, a cone/plate measuring system (Searle-System with measuring cone CP 50-1) is used. The shear rate is matched to the polymer viscosity: 1 to 99 mPa·s at 100 $s^{-1}$; 100 to 999 mPa·s at 200 $s^{-1}$; 1000 to 2999 mPa·s at 120 $s^{-1}$; 3000 to 4999 mPa·s at 80 $s^{-1}$; 5000 to 9999 mPa·s at 62 $s^{-1}$; 10,000 to 12,499 mPa·s at 50 $s^{-1}$; 12,500 to 15,999 mPa·s at 38.5 $s^{-1}$; 16,000 to 19,999 mPa·s at 33 $s^{-1}$; 20,000 to 24,999 mPa·s at 25 $s^{-1}$; 25,000 to 29,999 mPa·s at 20 $s^{-1}$; 30,000 to 39,999 mPa·s at 17 $s^{-1}$; 40,000 to 59,999 mPa·s at 10 $s^{-1}$; 60,000 to 149,999 at 5 $s^{-1}$; 150,000 to 199,999 mPa·s at 3.3 $s^{-1}$; 200,000 to 299,999 mPa·s at 2.5 $s^{-1}$; 300,000 to 1,000,000 mPa·s at 1.5 $s^{-1}$.

After the measuring system has been adjusted to the measuring temperature, a three-stage measuring program consisting of a run-in phase, a pre-shear and a viscosity measurement is applied. The run-in phase is carried out by increasing the shear rate stepwise within one minute to the shear rate indicated above, which is dependent on the viscosity to be expected and at which the measurement is to be carried out. As soon as that shear rate is reached, pre-shear takes place at a constant shear rate for 30 seconds and then, for determining the viscosity, 25 individual measurements are carried out for in each case 4.8 seconds, from which the mean is determined. The mean corresponds to the dynamic viscosity, which is reported in mPa·s.

Description of the Determination of the Molecular Weight Distributions

Method: Size exclusion chromatography (SEC) in accordance with DIN 55672-1

Flow rate: 1.00 ml/min

Injection system: Agilent 1200 autosampler (Agilent Technologies)

Injection volume: 100 μl

Eluent: In the case of products comprising phenyl groups, tetrahydrofuran >99.5%, stabilized with 250 ppm of 2,6-di-tert-butyl-4-methylphenol (BHT), was used; in the case of materials not comprising phenyl groups, toluene >99.9%, analytical grade, was used. All the chemicals are obtainable commercially, for example from Merck KGaA, Darmstadt, Germany.

Column: Stationary phase: polystyrene-divinylbenzene from Agilent Technologies

Four columns were connected in series, consisting of a pre column having a length of 50 mm and three separating columns each having a length of 300 mm. All the columns had an inside diameter of 7.8 mm. The gels used had a particle size of 5 μm. The pore size of the pre-column was 500 Å, that of the three separating columns was, in order, 10,000 Å, 500 Å and 100 Å.

Column temperature: Oven temperature 45° C. The concentration was determined with an RI detector (measuring principle deflection, type: Agilent 1200; cell volume: 8 μl; temperature: 45° C.)

The system was calibrated with polystyrene standards likewise obtainable commercially from Agilent. Concentration: 0.4 g/l (EasiCal, ready-for-use polystyrene calibrating agent; injection volume: 100 μl. As internal standard for toluene as eluent, tetrahydrofuran was used as marker substance, and as internal standard for tetrahydrofuran as eluent, toluene was used as marker substance. Fitting of calibration curves: third order polynomial fit PSS. Sample preparation: Approximately 15-50 mg of the sample to be measured were dissolved in the respective eluent (c=approximately 3-10 mg/ml). The amount of sample was such that a clear RI signal could be obtained. All the samples could be dissolved completely in the eluent.

Evaluation: The molar weights determined were in each case rounded to whole hundreds.

Gel Time

In the present invention, the gelling time was measured in accordance with standards DIN 16945 Sheet 1, DIN 16919 and DIN EN 14022, using a gel timer from GELNORM® with control unit ST-1 and thermoblock GT with thermograph TC-3 regulator. The production of the mixtures and the conduct of the measurement took place as described in example B1. A measuring die made of aluminum wire was used. The reciprocal cycle of the measuring die was 10 seconds. Two gel time measurements were carried out in each case, at 25° C. and 100° C. The value reported in table 1 corresponds to the mean of the two individual measurements at the respective measurement temperature. Measurement was discontinued if, after 60 minutes, the mixture had not gelled, in which case the gel time was reported as >60 min.

Working Time

For the determination of the working time, the test mixture was introduced into a PTFE mold to a fill height of 10 mm. The mixture was stored at 23° C., and the Shore A hardness was determined according to DIN EN ISO 868:2003-10 using a Shore A Durometer every 5 minutes. The length×width dimensions of the PTFE mold were selected to allow up to 18 individual measurements, with the measuring distances being at least 6 mm from one another and from the edge of the PTFE mold. When the hardness had risen by at least 5 Shore A, measurement was discontinued and the time elapsed prior to the rise in hardness, minus 5 minutes, was defined as the working time. Working times above 90 minutes have been reported in table 2 as >90 min.

Flexural Strength

In the present invention, apart from example B20, the flexural strength was measured in accordance with ISO 178:2011-04 Method A with a test speed of 2 mm/min at a support distance of 60 mm.

The procedure was preferably as follows: Test specimens of dimensions length×width×thickness=80 mm×10 mm×4 mm were used. The measurements were each carried out on 5 test specimens. The test specimens were produced by injection molding methods using a tool having exchangeable mold cavity plates according to DIN EN ISO 10724-1:2002-04, as specified in example B6 and cured under the conditions (temperature, time) indicated in example B6. In the test, the test specimens were always inserted into the machine in the same manner as they were positioned in the injection mold, that is to say with the bottom side downward. Before the measurement, the test specimens were stored at 23° C. and 50% relative humidity for four days. The value reported in table 2 for the flexural strength in MPa corresponds to the respective mean of the individual measurements, rounded to whole numbers in accordance with DIN 1333:1992-02 Section 4.

The flexural strength of example 20 was measured in accordance with DIN EN 14617-2:2008-11 at a support distance of 180 mm.

The procedure was as follows: Test specimens of dimensions length×width×thickness=200 mm×50 mm×10 mm were used. The measurements were each carried out on 3 test specimens. The test specimens were produced as indicated in example B20 and were cured under the conditions (temperature, time) indicated in example B20. In the test, the test specimens were always inserted into the machine in the same manner as they were positioned in the injection mold, that is to say with the bottom side downward. Before the measurement, the test specimens were stored at 23° C. and 50% relative humidity for 4 days. The value reported in table 2 for the flexural strength in MPa corresponds to the respective mean of the individual measurements, rounded to 0.1 MPa in accordance with DIN 1333:1992-02 Section 4.

Shore D Hardness

The Shore D hardness was determined in accordance with DIN EN ISO 868:2003-10. The measurement was carried out using a Shore D durometer on test specimens in sheet form of dimensions length×width×thickness=40 mm×40 mm×6 mm, which were produced by injection molding methods using a tool having exchangeable mold cavity plates in accordance with DIN EN ISO 10724-1:2002-04 Form 2 as described in example B6 and cured under the conditions (temperature, time) indicated in example B6. Shore D hardness for example B20 was determined on the flexural strength test specimens. Before the measurement, the test specimens were stored at 23° C. and 50% relative humidity for 4 days. The Shore D hardness was measured on the top and bottom sides of 3 test specimens in each case, giving a total of 6 measurement values. The value reported in table 2 corresponds to the mean of the individual measurements.

Organosiloxane Resin Mixture A1:

100 g of a pulverulent organopolysiloxane resin having an average molecular weight Mw of 6600 g/mol, an average molecular weight Mn of 2000 g/mol and a polydispersity of 3.3, with the average formula $(MeSiO_{3/2})_{0.88}(MeSi(OH)O_{2/2})_{0.05}(MeSi(OEt)O_{2/2})_{0.06}(Me_2SiO_{2/2})_{0.01}$, 67 g of an organosilicon compound having the average composition $(i\text{-}OctSi(OMe)O_{2/2})_{0.12}$ $(i\text{-}OctSiO_{3/2})_{0.05}(i\text{-}OctSi(OMe)_2O_{1/2})_{0.08}(MeSiO_{3/2})_{0.22}$ $(MeSi(OMe)O_{2/2})_{0.33}(MeSi(OMe)_2O_{1/2})_{0.20}$ with an average molecular weight Mw of 1600 g/mol, an average molecular weight Mn of 700 g/mol and a polydispersity of 2.3, and 8 g of a linear polydimethylsiloxane HO-$(Me_2SiO)_{12}$—H, were charged to a round-bottomed flask. The mixture was then heated with stirring to 55° C., forming a homogeneous mixture. Thereafter the temperature of the mixture was raised to 95° C. and, when this temperature had been reached, a pressure of 100 mbar was applied. Under these conditions, stirring continued for 2.5 hours more, after which the mixture was cooled to a temperature of 23° C. under a pressure of 100 mbar, before the reduced pressure was broken.

The resin mixture obtained in this way had a dynamic viscosity of 6000 mPa·s at 25° C. and a dynamic viscosity of 200 mPa·s at 80° C.

Organosiloxane Resin Mixture A2:

100 g of a pulverulent organopolysiloxane resin having an average molecular weight Mw of 6600 g/mol, an average molecular weight Mn of 2000 g/mol and a polydispersity of 3.3, with the average formula $(MeSiO_{3/2})_{0.88}(MeSi(OH)O_{2/2})_{0.05}$ $(MeSi(OEt)O_{2/2})_{0.06}(Me_2SiO_{2/2})_{0.01}$, 18 g of (2,4,4-trimethylpentyl)trimethoxysilane, 55 g of an organosilicon compound having the average composition $(MeSiO_{3/2})_{0.49}$ $(MeSi(OH)O_{2/2})_{0.02}(Me_2SiO_{2/2})_{0.46}$ $(Me_2Si(OH)O_{1/2})_{0.03}$ with an average molecular weight Mw of 4500 g/mol, an average molecular weight Mn of 1600 g/mol and a polydispersity of 2.8, and 9 g of a linear polydimethylsiloxane HO-$(Me_2SiO)_{12}$—H, were charged to a round-bottomed flask. The mixture was then heated with stirring to 55° C., forming a homogeneous mixture. Thereafter the temperature of the mixture was raised to 95° C. and, when this temperature had been reached, a pressure of 100 mbar was applied. Under these conditions, stirring continued for 2.5 hours more, after which the mixture was cooled to a temperature of 23° C. under a pressure of 100 mbar, before the reduced pressure was broken.

The resin mixture obtained in this way had a dynamic viscosity of 13,000 mPa·s at 25° C. and a dynamic viscosity of 270 mPa·s at 80° C.

Organosiloxane Resin Mixture A3:

100 g of a pulverulent organopolysiloxane resin having an average molecular weight Mw of 1700 g/mol, an average molecular weight Mn of 1200 g/mol and a polydispersity of 1.4, with the average formula $(MeSiO_{3/2})_{0.32}(MeSi(OH)O_{2/2})_{0.06}$ $(MeSi(OEt)O_{2/2})_{0.01}(Me_2SiO_{2/2})_{0.06}(PhSiO_{3/2})_{0.23}$ $(PhSi(OH)O_{2/2})_{0.29}(PhSi(OEt)O_{2/2})_{0.03}$, 113 g of organosilicon compound having the average composition $(MeSiO_{3/2})_{0.10}(MeSi(OMe)O_{2/2})_{0.17}(MeSi(OMe)_2O_{1/2})_{0.03}$ $(PhSiO_{3/2})_{0.15}(PhSi(OMe)O_{2/2})_{0.31}(PhSi(OMe)_2O_{1/2})_{0.20}$ $(Me_2SiO_{2/2})_{0.04}$ with an average molecular weight Mw of 1800 g/mol, an average molecular weight Mn of 900 g/mol and a polydispersity of 2.0, and 38 g of phenyltriethoxysilane, were charged to a round-bottomed flask. The mixture was then heated with stirring to 55° C., forming a homogeneous mixture. Thereafter the temperature of the mixture was raised to 95° C. and, when this temperature had been reached, a pressure of 100 mbar was applied. Under these conditions, stirring continued for 2.5 hours more, after which the mixture was cooled to a temperature of 23° C. under a pressure of 100 mbar, before the reduced pressure was broken.

The resin mixture obtained in this way had a dynamic viscosity of 3000 mPa·s at 25° C. and a dynamic viscosity of 180 mPa·s at 80° C.

Preparation of the Curing Agent Mixture in Working Examples B6, B8, B11, B18, B19 and B20

The curing agent mixtures were prepared by adding a mixture of amidine or guanidine and (2,4,4-trimethylpentyl)trimethoxysilane to a mixture of zinc(II) acetylacetonate and absolute ethanol. This was followed by mixing, with simultaneous heating, if necessary, to not more than 50° C., until a solution was formed.

Preparation of the Curing Agent Mixture in Working Examples B7, B9, B10, B12, B13, B14, B15, B16, B17, B22, B23 and B24

The curing agent mixtures were prepared by first adding, in this order, the amidine or guanidine and subsequently the organic acid, where used, to a mixture of metal compound in absolute methanol. This was followed by mixing, with simultaneous heating, if necessary, to not more than 50° C., until a solution was formed.

Production of the Curing Agent Mixture in Working Example B21

The curing agent mixture was prepared by adding zinc(II) 2-ethylhexanoate to a mixture of guanidine and (2,4,4-trimethylpentyl)trimethoxysilane. This was followed by mixing until a solution was formed.

Production of the Curing Agent Mixture in Working Example B25

The curing agent mixture was produced by adding the guanidine to bis(ethylacetoacetato)bis(propan-2-olato)titanium(IV) (Tytan S2; CAS No. 27858-32-8, available commercially from Borica, 3950 Bocholt, Belgium). This was followed by mixing until a solution was formed.

Preparation of the Curing Agent Mixture in Comparative Examples C5, C6, C7, C8, C9, C10, C11, C12 and C13

The curing agent mixtures were prepared by dissolving the corresponding amidine or guanidine in (2,4,4-trimethylpentyl)trimethoxysilane and absolute ethanol or in absolute methanol, or by dissolving the respective metal compound either in a mixture of (2,4,4-trimethylpentyl)trimethoxysilane and absolute ethanol, or in absolute methanol, with mixing, with simultaneous heating, if necessary, to not more than 50° C.

Example B1

For a gel time measurement, 0.04 g of 1,1,3,3-tetramethylguanidine ("TMG"; CAS No. 80-70-6; available commercially from Sigma-Aldrich®, Steinheim, DE) was diluted in 0.04 g of (2,4,4-trimethylpentyl)trimethoxysilane (CAS No. 88468-45-5; available commercially from Sigma-Aldrich®, Steinheim, DE) and this solution was subsequently added to a mixture of 0.092 g of zinc(II) acetylacetonate ("Zn(acac)$_2$", CAS No. 14024-63-6, available commercially e.g. from Merck KGaA, Darmstadt, DE) in 0.048 g of absolute ethanol (available commercially from Sigma-Aldrich®, Steinheim, DE); the mixture was stirred intimately with heating to 45° C. until a solution was formed. The catalyst solution was then mixed with 10 g of the resin mixture A1 in a Speedmixer™ DAC 150 FVZ from Hauschild & Co. KG for 30 seconds at 2000 r·min$^{-1}$, and lastly the mixture was transferred to a test tube for determination of gel time. The results are found in table 1.

Example B2

Example B1 was repeated, with the difference that instead of a mixture of 0.092 g of Zn(acac)$_2$ in 0.048 g of absolute ethanol, a mixture of 0.061 g of zinc(II) 2-ethylhexanoate (CAS No. 136-53-8; available commercially from ABCR, Karlsruhe, DE) in 0.024 g of absolute ethanol was used, and mixing took place at 23° C.
The results are found in table 1.

Example B3

Example B1 was repeated, with the difference that instead of a solution of 0.04 g of 1,1,3,3-tetramethylguanidine in 0.04 g of (2,4,4-trimethylpentyl)trimethoxysilane, 0.043 g of 1,5-diazabicyclo[4.3.0]non-5-ene ("DBN", CAS No. 3001-72-7, available commercially from Sigma-Aldrich®, Steinheim, DE) and, instead of a mixture of 0.092 g of Zn(acac)$_2$ in 0.048 g of absolute ethanol, a mixture of 0.092 g of Zn(acac)$_2$ in 0.138 g of absolute methanol (available commercially from Sigma-Aldrich®, Steinheim, DE) were used.
The results are found in table 1.

Example B4

Example B1 was repeated with the difference that instead of resin mixture A1 resin mixture A3 was used.
The results are found in table 1.

Example B5

Example B1 was repeated with the difference that instead of a mixture of 0.092 g of Zn(acac)$_2$ in 0.048 g of absolute ethanol, a mixture of 0.25 g of bismuth(III) neodecanoate (CAS No. 34364-26-6; available commercially from Sigma-Aldrich®, Steinheim, DE) in 0.024 g of absolute ethanol was used and mixing took place at 23° C.

The results are found in table 1.

Comparative Example C1

Example B1 was repeated with the difference that no Zn(acac)$_2$ was used and mixing took place at 23° C.
The results are found in table 1.

Comparative Example C2

Example B1 was repeated with the difference that no TMG was used.
The results are found in table 1.

Comparative Example C3

Example B2 was repeated with the difference that no TMG was used.
The results are found in table 1.

Comparative Example C4

Example B3 was repeated with the difference that no Zn(acac)$_2$ was used.
The results are found in table 1.

TABLE 1

| | | | gel times | | | | | |
|---|---|---|---|---|---|---|---|---|
| Examples | Resin mixture | Zn(II) acetylacetonate g | Zn(II) 2-ethyl-hexanoate g | Bi(III) neodecanoate g | TMG g | DBN g | Gel time 25° C. min:sec | Gel time 100° C. min:sec |
| B1 | A1 | 0.092 | | | 0.04 | | >60:00 | 05:10 |
| B2 | A1 | | 0.061 | | 0.04 | | >60:00 | 04:59 |
| B3 | A1 | 0.092 | | | | 0.043 | >60:00 | 04:49 |
| B4 | A3 | 0.092 | | | 0.04 | | >60:00 | 06:14 |
| B5 | A1 | | | 0.25 | 0.04 | | >60:00 | 06:29 |
| C1 | A1 | | | | 0.04 | | 03:55 | 01:40 |
| C2 | A1 | 0.092 | | | | | >60:00 | 16:10 |
| C3 | A1 | | 0.061 | | | | >60:00 | >60:00 |
| C4 | A1 | | | | | 0.043 | 02:01 | 01:05 |

Example B6

100 g of the resin mixture A1 and 300 g of Quarzmehl 16900 (finely ground quartz, available commercially from Amberger Kaolinwerke, Hirschau, DE) were mixed for 30 seconds at 3000 r·min$^{-1}$ in a Speedmixer™ DAC 150 FVZ from Hauschild & Co. KG. The mixture was then allowed to stand until it had cooled to a temperature of 23° C. Thereafter, as curing agent mixture, a solution of 0.50 g of 1,1,3,3-tetramethylguanidine, 0.50 g of (2,4,4-trimethylpentyl)trimethoxysilane and 1.14 g of zinc(II) acetylacetonate in 0.50 g of absolute ethanol was added to the above-described mixture consisting of A1 and finely ground quartz.
The mixture was subsequently mixed for 15 seconds in the Speedmixer™ at 2000 r·min$^{-1}$, then briefly stirred by hand, and finally mixed for a further 15 seconds in the Speedmixer™ at 2000 r·min$^{-1}$. The working time of the mixture was determined, and test specimens were produced. The test specimens were produced using an oil-hydraulic press of type VSKO 75 from Lauffer GmbH & Co. KG. The press was equipped with a tool having exchangeable mold cavity plates according to DIN EN ISO 10724-1:2002-04, with which it was possible to produce test specimens of dimensions length×width×thickness=80 mm×10 mm×4 mm (for testing the flexural strength). The mold was closed hydraulically with a closing force of 140 kN. The external dimensions of the mold were length×width=450 mm×450 mm. The press die had a diameter of 50 mm. To produce the test specimens, 100 g of the above-described mixture were introduced and injected with a pressing force of 5 kN into the respective mold cavity, which had been preheated to a temperature of 120° C. When the mold cavities were completely full, the pressing force increased to 25 kN. At this point, the hydraulics were switched off. In the course of curing, the force slowly decreased and was 14 kN at the end of the overall pressing and curing operation. After 30 minutes at 120° C., the tool was opened and the test specimens were removed.

The test specimens thus obtained were examined for their properties. The results are found in table 2.

Example 87

Example B6 was repeated with the difference that the curing agent mixture used was a solution of 0.50 g of 1,1,3,3-tetramethylguanidine and 1.14 g of zinc(II) acetylacetonate in 1.00 g of absolute methanol.

The results are found in table 2.

Example B8

Example B6 was repeated with the difference that the curing agent mixture used was a solution of 0.80 g of 1,1,3,3-tetramethylguanidine, 0.80 g of (2,4,4-trimethylpentyl)trimethoxysilane and 1.36 g of zinc(II) acetylacetonate in 0.60 g of absolute ethanol.

The results are found in table 2.

Example B9

Example B6 was repeated with the difference that the curing agent mixture used was a solution of 0.50 g of 1,1,3,3-tetramethylguanidine, 0.57 g of zinc(II) acetylacetonate and 0.31 g of n-octanoic acid (CAS No. 124-07-2; available commercially from Sigma-Aldrich®, Steinheim, DE) in 0.24 g of absolute methanol.

The results are found in table 2.

Example B10

Example B6 was repeated with the difference that the curing agent mixture used was a solution of 0.50 g of 1,1,3,3-tetramethylguanidine, 1.14 g of zinc(II) acetylacetonate and 0.63 g of n-octanoic acid in 0.24 g of absolute methanol.

The results are found in table 2.

Example B11

Example B6 was repeated with the difference that the curing agent mixture used was a solution of 0.53 g of 1,8-diazabicyclo[5.4.0]undec-7-ene ("DBU"; CAS No. 6674-22-2; available commercially from Sigma-Aldrich®, Steinheim, DE)), 0.92 g of zinc(II) acetylacetonate and 0.50 g of (2,4,4-trimethylpentyl)trimethoxysilane in 0.90 g of absolute ethanol.

The results are found in table 2.

Example B12

Example B6 was repeated with the difference that the curing agent mixture used was a solution of 0.20 g of 1,8-diazabicyclo[5.4.0]undec-7-ene and 0.02 g of zinc(II) acetylacetonate in 0.47 g of absolute methanol.

The results are found in table 2.

Example B13

Example B6 was repeated with the difference that the curing agent mixture used was a solution of 0.66 g of 1,8-diazabicyclo[5.4.0]undec-7-ene and 1.20 g of zinc(II) acetylacetonate in 2.80 g of absolute methanol.

The results are found in table 2.

Example B14

Example B6 was repeated with the difference that the curing agent mixture used was a solution of 0.43 g of 1,5-diazabicyclo[4.3.0]non-5-ene ("DBN"; CAS No. 3001-72-7; available commercially from Sigma-Aldrich®, Steinheim, DE) and 0.92 g of zinc(II) acetylacetonate in 1.38 g of absolute methanol.

The results are found in table 2.

Example B15

Example B6 was repeated with the difference that the curing agent mixture used was a solution of 0.60 g of 1,5,7-triazabicyclo[4.4.0]dec-5-ene ("TBD"; CAS No. 5807-14-7; available commercially from Sigma-Aldrich®, Steinheim, DE) and 1.19 g of zinc(II) acetylacetonate in 1.82 g of absolute methanol.

The results are found in table 2.

Example B16

Example B6 was repeated with the difference that the curing agent mixture used was a solution of 0.60 g of 7-methyl-1,5,7-triazabicyclo[4.4.0]dec-5-ene ("Me-TBD"; CAS No. 84030-20-6; available commercially from Sigma-Aldrich®, Steinheim, DE) and 1.19 g of zinc(II) acetylacetonate in 0.50 g of absolute methanol.

The results are found in table 2.

Example B17

Example B6 was repeated with the difference that the curing agent mixture used was a solution of 0.38 g of 1,4,5,6-tetrahydropyrimidine ("THP"; CAS No. 1606-49-1; available commercially from Sigma-Aldrich®, Steinheim, DE) and 1.20 g of zinc(II) acetylacetonate in 2.80 g of absolute methanol.

The results are found in table 2.

Example B18

Example B6 was repeated with the difference that instead of the resin mixture A1, resin mixture A2 was used, and the curing agent mixture used was a solution of 0.40 g of 1,1,3,3-tetramethylguanidine, 0.92 g of zinc(II) acetylacetonate and 0.40 g of (2,2,4-trimethylpentyl)trimethoxysilane in 0.24 g of absolute methanol.

The results are found in table 2.

Example B19

Example B6 was repeated with the difference that instead of the resin mixture A1, resin mixture A3 was used, and the curing agent mixture used was a solution of 0.40 g of 1,1,3,3-tetramethylguanidine, 0.46 g of zinc(II) acetylacetonate and 0.40 g of (2,2,4-trimethylpentyl)trimethoxysilane in 0.24 g of absolute ethanol. The mixture was cured at 120° C. for 60 minutes.

The results are found in table 2.

Example B20

300 g of coarsely particulate quartz of type "quartz gravel SB 1.5-2.2T" with a particle size of 1.5 mm to 2.2 mm, 220 g of coarsely particulate quartz of type "quartz sand SB 0.7-1.2T" with a particle size of 0.7 mm to 1.2 mm, 210 g of coarsely particulate quartz of type "quartz sand SB 0.3-0.9T" with a particle size of 0.3 mm to 0.9 mm, all three available commercially from Amberger Kaolinwerke Eduard Kick GmbH & Co. KG at Hirschau, DE, were charged to a drum mixer and intimately mixed for 1 minute. Then 100 g of resin mixture A1, conditioned at 23° C., were added and mixing was continued for 3 minutes more. Thereafter, as curing agent mixture, a solution of 0.52 g of 1,1,3,3-tetramethylguanidine and 1.20 g of zinc(II) acetylacetonate in 1.00 g of absolute methanol was added, and mixing took place for a further 2 minutes. After that, 320 g of finely divided quartz with an upper particle size $d_{95\%}$ of 50 µm and an average particle size $d_{50\%}$ of 16 µm, of type Millisil W12 (available commercially from Quarzwerke GmbH, Frechen, DE) were mixed in portions into the mixture; lastly, mixing took place for 2 minutes in turn. This mixture, which had a consistency resembling that of wet sand, was introduced into a stainless steel mold cavity with dimensions of length×width×height=220 mm×170 mm×15 mm. The composition was precompacted in the mold on a shaker table with a frequency of 50 Hz within 2 minutes. The mold was subsequently mounted into a hydraulic press, and the contents of the mold were compacted with a pressing force of 150 kN. This corresponds to a pressing pressure, based on the surface area of the test plate to be produced, of 4000 kPa. The mold was then stored in an oven at 120° C. for 45 minutes. After cooling to room temperature, the shaped article was removed from the mold, and the shaped article was stored at ambient temperature for 4 days. Test specimens with dimensions of length×width×height=200 mm×50 mm×10 mm were then produced from the shaped article. These test specimens were used for measurements of the Shore D hardness and also the flexural strength in accordance with DIN EN 14617-2:2008-11.

The results are found in table 2.

Example B21

Example B6 was repeated with the difference that a curing agent mixture of 0.50 g of 1,1,3,3-tetramethylguanidine, 1.53 g of zinc(II) 2-ethylhexanoate and 0.50 g of 2,4,4-(trimethylpentyl)trimethoxysilane was used.

The results are found in table 2.

Example B22

Example B6 was repeated with the difference that the curing agent mixture used was a solution of 0.50 g of 1,1,3,3-tetramethylguanidine and 1.75 g of bismuth(III) neodecanoate in 0.24 g of absolute methanol.

The results are found in table 2.

Example B23

Example B6 was repeated with the difference that the curing agent mixture used was a solution of 0.50 g of 1,1,3,3-tetramethylguanidine and 0.71 g of zirconium(IV) 2-ethylhexanoate in 0.24 g of absolute methanol.

The results are found in table 2.

Example B24

Example B6 was repeated with the difference that the curing agent mixture used was a solution of 0.50 g of 1,1,3,3-tetramethylguanidine and 0.78 g of aluminum(III) neodecanoate in 0.24 g of absolute methanol.

The results are found in table 2.

Example B25

Example B6 was repeated with the difference that a curing agent mixture of 0.40 g of 1,1,3,3-tetramethylguanidine and 1.57 g of bis(ethylaceto-acetato)bis(propan-2-olato)titanium (IV)) was used.

The results are found in table 2.

Comparative Example C5

The procedure described in example B6 was repeated with the modification that the curing agent mixture used was a solution of 0.50 g of 1,1,3,3-tetramethylguanidine and 0.50 g of (2,4,4-trimethylpentyl)trimethoxysilane in 0.50 g of absolute ethanol.

The results are found in table 2.

Comparative Example C6

The procedure described in example B6 was repeated with the modification that the curing agent mixture used was a solution of 0.20 g of 1,8-diazabicyclo[5.4.0]undec-7-ene in 0.47 g of absolute methanol.

The results are found in table 2.

Comparative Example C7

The procedure described in example B6 was repeated with the modification that the curing agent mixture used was a solution of 0.43 g of 1,5-diazabicyclo[4.3.0]non-5-ene in 0.66 g of absolute methanol.

The results are found in table 2.

Comparative Example C8

The procedure described in example B6 was repeated with the modification that the curing agent mixture used was a solution of 1.14 g of zinc(II) acetylacetonate and 0.50 g of (2,4,4-trimethylpentyl)trimethoxysilane in 0.50 g of absolute ethanol.

The results are found in table 2.

Comparative Example C9

The procedure described in example B6 was repeated with the modification that a curing agent mixture of 1.53 g of zinc(II) 2-ethylhexanoate and 0.50 g of (2,4,4-trimethylpentyl)trimethoxysilane was used.

The results are found in table 2.

Comparative Example C10

The procedure described in example B6 was repeated with the modification that the curing agent mixture used was a solution of 1.75 g of bismuth(III) neodecanoate in 0.24 g of absolute methanol.

The results are found in table 2.

Comparative Example C11

The procedure described in example B6 was repeated with the difference that the curing agent mixture used was a solution of 1.42 g of zirconium(IV) 2-ethylhexanoate in 0.24 g of absolute methanol.

The results are found in table 2.

Comparative Example C12

Example B6 was repeated with the difference that the curing agent mixture used was a solution of 1.56 g of aluminum(III) neodecanoate in 0.24 g of absolute methanol.

The results are found in table 2.

Comparative Example C13

Example B6 was repeated with the difference that the curing agent used was 1.57 g of bis(ethylaceto-acetato)bis(propan-2-olato)titanium(IV).

The results are found in table 2.

TABLE 2

Working time at 23° C. and mechanical data measured after 4 days of prior storage of the specimens at 23° C. and 50% relative humidity

| Examples | Working time at 23° C. min | Hardness Shore D | Flexural strength MPa |
|---|---|---|---|
| B6 | >90 | 82 | 44 |
| B7 | >90 | 83 | 46 |
| B8 | 75 | 84 | 40 |
| B9 | 70 | 78 | 26 |
| B10 | >90 | 81 | 28 |
| B11 | >90 | 82 | 42 |
| B12 | >90 | 84 | 39 |
| B13 | 65 | 84 | 33 |
| B14 | >90 | 85 | 36 |
| B15 | >90 | 82 | 32 |
| B16 | >90 | 83 | 30 |
| B17 | >120 | 84 | 31 |
| B18 | 75 | 75 | 34 |
| B19 | >90 | 78 | 29 |
| B20 | 50 | 86 | 19.8 |
| B21 | >90 | 78 | 27 |
| B22 | >90 | 75 | 22 |
| B23 | 50 | 76 | 19 |
| B24 | >90 | 68 | 19 |
| B25 | 40 | 81 | 34 |
| C5 | 5 | 74 | 31 |
| C6 | 10 | 86 | 42 |
| C7 | 5 | 87 | 36 |
| C8 | >90 | * | * |
| C9 | >90 | * | * |
| C10 | >90 | * | * |
| C11 | >90 | * | * |
| C12 | >90 | * | * |
| C13 | >90 | * | * |

*not measurable since no vulcanization took place

The invention claimed is:

1. A composition (Z) crosslinkable by condensation reaction, comprising:
    (A) at least one organosilicon component comprising units of the formula $$R_a(OH)_b(R^1O)_c SiO_{(4-a-b-c)/2} \quad (I),$$

in which
R each are identical or different and are monovalent, SiC-bonded, optionally substituted hydrocarbon radicals having 1 to 18 C atoms, divalent, optionally substituted, SiC-bonded hydrocarbon radical having 1 to 18 C atoms, or Si-bonded halogen atoms,
$R^1$ each are may be identical or different and are monovalent, optionally substituted hydrocarbon radicals,
a is 0, 1, 2 or 3,
b is 0, 1, 2 or 3, and
c is 0, 1, 2 or 3,
with the provisos that in formula (I) the sum a+b+c<4,
in the organosilicon component (A) the degree of branching, defined as the ratio of the sum of the units of the formula (I) where a is 0 or 1 to the sum of all units of the formula (I), is at least 0.5, and in the organosilicon component (A) in at least 1% of all units of the formula (I) the sum b+c≥1,
    (B) at least one metal compound selected from compounds of metals from main groups 3, 4, and 5 and also from transition groups 2, 4, 5, 7, and 8 in the +2 to +5 oxidation states, which comprise at least one carbon atom in a<4 oxidation state, and
    (C) at least one nitrogen compound selected from guanidines and amidines, wherein nitrogen compounds (C) are used in amounts of 0.1 to 10.0 mol per 1.0 mol of metal compound (B).

2. The composition of claim 1, wherein the organosilicon component (A) contains not only Si-bonded hydroxyl but also Si-bonded ($R^1O$) groups.

3. The composition of claim 2, wherein the organosilicon component (A) comprises units selected from the group consisting of $RSiO_{3/2}$, $RSi(OR^1)O_{2/2}$, $RSi(OH)O_{2/2}$, $RSi(OR^1)_2O_{1/2}$, $RSi(OH)(OR^1)O_{1/2}$, $R_2SiO_{2/2}$, $R_2(OH)SiO_{1/2}$, $R_2(OR^1)SiO_{1/2}$, $R_3SiO_{1/2}$, $SiO_{4/2}$, $Si(OH)O_{3/2}$, $Si(OR^1)O_{3/2}$, $Si(OR^1)_2O_{2/2}$, $Si(OR^1)(OH)O_{2/2}$, $Si(OR^1)_2(OH)O_{1/2}$, $Si(OR^1)_3O_{1/2}$, $O_{3/2}SiRSiO_{3/2}$ and mixtures thereof.

4. The composition of claim 2, wherein the metal compounds (B) are at least one of aluminum(III), bismuth(III), iron(II), iron(III), manganese(II), manganese(III), titanium(III), titanium(IV), vanadium(III), vanadium(IV), vanadium(V), zinc(II), tin(II), tin(IV), zirconium(IV), tantalum(V) or niobium(V) compounds.

5. The composition of claim 1, wherein the organosilicon component (A) comprises units selected from the group consisting of $RSiO_{3/2}$, $RSi(OR^1)O_{2/2}$, $RSi(OH)O_{2/2}$, $RSi(OR^1)_2O_{1/2}$, $RSi(OH)(OR^1)O_{1/2}$, $R_2SiO_{2/2}$, $R_2(OH)SiO_{1/2}$, $R_2(OR^1)SiO_{1/2}$, $R_3SiO_{1/2}$, $SiO_{4/2}$, $Si(OH)O_{3/2}$, $Si(OR^1)O_{3/2}$, $Si(OR^1)_2O_{2/2}$, $Si(OR^1)(OH)O_{2/2}$, $Si(OR^1)_2(OH)O_{1/2}$, $Si(OR^1)_3O_{1/2}$, $O_{3/2}SiRSiO_{3/2}$ and mixtures thereof.

6. The composition of claim 5, wherein the metal compounds (B) are at least one of aluminum(III), bismuth(III), iron(II), iron(III), manganese(II), manganese(III), titanium(III), titanium(IV), vanadium(III), vanadium(IV), vanadium(V), zinc(II), tin(II), tin(IV), zirconium(IV), tantalum(V) or niobium(V) compounds.

7. The composition of claim 1, wherein the metal compounds (B) are at least one of aluminum(III), bismuth(III), iron(II), iron(III), manganese(II), manganese(III), titanium(III), titanium(IV), vanadium(III), vanadium(IV), vanadium(V), zinc(II), tin(II), tin(IV), zirconium(IV), tantalum(V) or niobium(V) compounds.

8. The composition of claim 1, wherein metal compounds (B) are metal salt compounds (B-1).

9. The composition of claim 1, wherein metal compounds (B) are metal chelate compounds (B-2) of the formula (II)

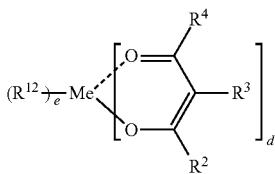

in which

Me is a metal selected from the group consisting of metals of main groups 3, 4, and 5 and also transition groups 2, 4, 5, 7, and 8 in the +2 to +5 oxidation state, $R^2$, $R^3$, and $R^4$ each independently of one another are hydrogen, optionally substituted hydrocarbon radicals or organyloxy radicals, $R^{12}$ are identical or different and are organyl oxide or oxide radicals, d is 1, 2, 3 or 4, and e is 0, 1, 2, 3 or 4, with the proviso that the sum d+e is 2 to 6.

10. The composition of claim 1, which is a composition comprising
    (A) at least one organosilicon component,
    (B) at least one metal compound,
    (C) at least one nitrogen compound,
    (D) optionally, solvents,
    (E) fillers,
    (F) optionally, one or more silanes,
    (G) optionally, one or more organic acids, and
    (H) optionally, further constituents other than constituents (A) through (H).

11. The composition of claim 10, where the total amount of filler (E) is from 70 to 99 weight percent based on the total weight of the composition.

12. A method for producing a composition of claim 1, comprising mixing the individual components in any order.

13. A shaped article produced by crosslinking a composition produced by the method of claim 12.

14. A method of producing artificial stone, comprising shaping and crosslinking a composition prepared by the method of claim 12.

15. A shaped article produced by crosslinking a composition of claim 1.

16. A method for producing artificial stone, comprising shaping and crosslinking a composition of claim 1.

17. A composition (Z) crosslinkable by condensation reaction, comprising:

(A) at least one organosilicon component comprising units of the formula $$R_a(OH)_b(R^1O)_c SiO_{(4-a-b-c)/2} \quad (I),$$

in which

R each are identical or different and are monovalent, SiC-bonded, optionally substituted hydrocarbon radicals having 1 to 18 C atoms, divalent, optionally substituted, SiC-bonded hydrocarbon radical having 1 to 18 C atoms, or Si-bonded halogen atoms, $R^1$ each are may be identical or different and are monovalent, optionally substituted hydrocarbon radicals, a is 0, 1, 2 or 3, b is 0, 1, 2 or 3, and c is 0, 1, 2 or 3, with the provisos that in formula (I) the sum a +b+c<4, in the organosilicon component (A) the degree of branching, defined as the ratio of the sum of the units of the formula (I) where a is 0 or 1 to the sum of all units of the formula (I), is at least 0.5, and in the organosilicon component (A) in at least 1% of all units of the formula (I) the sum b+c≥1, (B) at least one metal compound selected from compounds of metals from main groups 3, 4, and 5 and also from transition groups 2, 4, 5, 7, and 8 in the +2 to +5 oxidation states, which comprise at least one carbon atom in a<4 oxidation state, (C) at least one nitrogen compound selected from guanidines and amidines, and (E) a particulate filler comprising at least one coarse particulate filler having a mean particle size of 0.2 mm to 10 mm, the coarse particulate filler present in an amount of at least 20 weight percent, based on the total weight of the composition.

* * * * *

UNITED STATES PATENT AND TRADEMARK OFFICE
CERTIFICATE OF CORRECTION

PATENT NO. : 10,301,433 B2
APPLICATION NO. : 15/328088
DATED : May 28, 2019
INVENTOR(S) : Daniel Schildbach et al.

Page 1 of 1

It is certified that error appears in the above-identified patent and that said Letters Patent is hereby corrected as shown below:

On the Title Page

After:
(*) Notice: Subject to any terminal disclaimer, the term of this patent is extended or adjusted under 35 U.S.C. 154(b) by 73 days.

Delete:
"This patent is subject to a terminal disclaimer".

Signed and Sealed this
Twenty-first Day of April, 2020

Andrei Iancu
*Director of the United States Patent and Trademark Office*